United States Patent
Zielinski et al.

(10) Patent No.: US 7,386,981 B2
(45) Date of Patent: Jun. 17, 2008

(54) METHOD AND APPARATUS GENERATING MULTIPLE PRESSURE SIGNALS IN A FUEL SYSTEM

(75) Inventors: Edward J. Zielinski, Cincinnati, OH (US); Paul W. Futa, Jr., North Liberty, IN (US)

(73) Assignee: Honeywell International Inc., Morristown, NJ (US)

( * ) Notice: Subject to any disclaimer, the term of this patent is extended or adjusted under 35 U.S.C. 154(b) by 549 days.

(21) Appl. No.: 11/032,744

(22) Filed: Jan. 11, 2005

(65) Prior Publication Data

US 2005/0217235 A1 Oct. 6, 2005

Related U.S. Application Data

(60) Provisional application No. 60/608,514, filed on Sep. 10, 2004, provisional application No. 60/588,795, filed on Jul. 19, 2004, provisional application No. 60/562,628, filed on Apr. 16, 2004, provisional application No. 60/558,109, filed on Apr. 1, 2004, provisional application No. 60/557,705, filed on Mar. 31, 2004.

(51) Int. Cl.
*F02C 9/26* (2006.01)

(52) U.S. Cl. ...................... 60/772; 60/39.281

(58) Field of Classification Search ............... 60/39.27, 60/39.281, 734, 772; 137/613
See application file for complete search history.

(56) References Cited

U.S. PATENT DOCUMENTS

| | | | |
|---|---|---|---|
| 2,485,430 A * | 10/1949 | Chandler | 60/39.281 |
| 3,712,055 A | 1/1973 | Mccabe | |
| 4,602,479 A | 7/1986 | Hansen | |
| 5,551,478 A | 9/1996 | Veilleux, Jr. et al. | |
| 5,709,079 A | 1/1998 | Smith | |
| 6,059,537 A * | 5/2000 | Cygnor | 60/734 |
| 6,189,312 B1 | 2/2001 | Smith | |
| 6,321,527 B1 | 11/2001 | Dyer et al. | |
| 6,745,556 B2 | 6/2004 | Elliott | |
| 7,036,302 B2 * | 5/2006 | Myers et al. | 60/39.281 |
| 2003/0233823 A1 | 12/2003 | Futa et al. | |

FOREIGN PATENT DOCUMENTS

| | | |
|---|---|---|
| EP | 0 644 336 A1 | 3/1995 |
| EP | 1 344 916 A2 | 3/2002 |
| GB | 2 320 063 A | 6/1998 |
| WO | WO-99/35385 | 7/1999 |

\* cited by examiner

*Primary Examiner*—L. J. Casaregola
(74) *Attorney, Agent, or Firm*—Ingrassia Fisher & Lorenz

(57) ABSTRACT

A fuel system includes a first fuel line carrying fuel at a first line pressure (P22), a second fuel line carrying fuel at a second line pressure (PFNC) greater than the first line pressure (P22), at least one pressure regulating section 102 having an input 101 connected to the second fuel line and at least one output (103), a first pressure regulator (120) connected to the input and a second pressure regulator (130) connected between the first pressure regulator (120) and the at least one output (103), and a controller (160) controlling the position of the first and second pressure regulators (120, 130) to produce at the output (103) one of a predetermined number of output pressures relative to the first line pressure (P22).

26 Claims, 32 Drawing Sheets

METHOD AND APPARATUS GENERATING MULTIPLE PRESSURE SIGNALS IN A FUEL SYSTEM

CROSS REFERENCE TO RELATED APPLICATIONS

The present application claims the benefit of the following provisional applications:

| | |
|---|---|
| 60/557,705 filed | Mar. 31, 2004; |
| 60/558,109 filed | Apr. 1, 2004; |
| 60/562,628 filed | Apr. 16, 2004; |
| 60/588,795 filed | Jul. 19, 2004; and |
| 60/608,514 filed | Sep. 10, 2004. |

The entire contents of each of the above applications is hereby incorporated by reference.

FIELD OF THE INVENTION

The present invention is directed toward a method and apparatus for generating multiple pressure signals in a fuel system, and, more specifically, toward a method and apparatus for generating multiple pressure signals relative to a nozzle pressure in a fuel system supplying fuel to a gas turbine engine.

BACKGROUND OF THE INVENTION

Fuel systems, such as those used in gas turbine engines, for example, deliver a metered supply of fuel to a combustion chamber at a controllable pressure. Such fuel systems include various valves and other devices, the positions of which may be controlled by pressures from different parts of the system. It is desirable to provide a fuel control system that generates a plurality of pressure signals at two or more discrete levels, which pressure signals can be used to control the operation of and/or position of devices associated with the gas turbine engine.

SUMMARY OF THE INVENTION

The present invention provides a method and apparatus for producing multiple pressure signals at one or more locations, which pressure signals may be used, for example, for controlling the positions of actuators or related devices or for positioning actuators in one of a plurality of predetermined positions.

In a first aspect, the present invention comprises a fuel system that includes a first fuel line carrying fuel at a first line pressure and a second fuel line carrying fuel at a second line pressure greater than the first line pressure. At least one pressure regulating section is provided that includes an input connected to the second fuel line and at least one output, and a first pressure regulator is connected to the input and a second pressure regulator is connected between the first pressure regulator and the at least one output. A controller is also provided for controlling the position of the first and second pressure regulators to produce at the output one of a predetermined number of output pressures relative to the first line pressure.

An additional aspect of the invention comprises a method of operating a fuel system comprising a first fuel line carrying fuel at a first pressure and a second fuel line carrying fuel at a second pressure greater than the first pressure. The method establishes at at least one location a signal pressure at one of a plurality of discrete levels relative to the first pressure and includes the steps of providing a flow path between the second fuel line and the at least one location and providing a first pressure regulator regulating at a first pressure and a second pressure regulator regulating at a second pressure in the flow path. The positions of the first and second pressure regulators are controlled to establish first and second signal pressures at the at least one location.

A further aspect of the invention comprises a method of operating a fuel system that includes a first fuel line carrying fuel at a first line pressure and a second fuel line carrying fuel at a second line pressure greater than the first line pressure. The method establishes at a first location a first signal pressure at one of a plurality of discrete levels relative to the first line pressure and at a second location a second signal pressure at one of the plurality of discrete levels relative to the first line pressure. The method involves providing a first flow path connecting the second fuel line and the first and second locations and providing a first pressure regulator regulating at a first pressure and a second pressure regulator regulating at a second pressure in the flow path. In addition, a third pressure regulator regulating at the first pressure and a fourth pressure regulator regulating at the second pressure are provided in the flow path. The positions of the first, second, third and fourth pressure regulators are controlled to establish first and second signal pressures at the first and second locations.

Another aspect of the invention is a method of operating a fuel system that includes a first fuel line carrying fuel at a first line pressure and a second fuel line carrying fuel at a second line pressure greater than the first line pressure. The method establishes at first and second outputs of a pressure regulating section first and second signal pressures each at one of a plurality of discrete levels relative to the first line pressure. The method involves providing a first set of n pressure regulating valves in the pressure regulating section in communication with the second fuel line, each pressure regulating valve of the first set regulating at a different pressure than the other pressure regulating valves in the first set and controlling the positions of the n pressure regulating valves to produce one of at least n discrete pressure levels at the first output.

An additional aspect of the invention comprises a fuel system that includes a first fuel line carrying fuel at a first line pressure and a second fuel line carrying fuel at a second line pressure greater than the first line pressure. At least one pressure regulating section comprising an input connected to the second fuel line and first and second outputs is also provided. A plurality of first pathways extend from the second fuel line to the first output and a plurality of second pathways from the second fuel line to the second output, and a pressure regulating valve is provided in each of the first pathways and second pathways. In addition, a spool valve is positionable to selectively control fluid flow through each of the first and second pathways, and a controller controls the position of the spool to selectively produce a first pressure at the first output and a second pressure at the second output.

Another aspect of the invention is a fuel system for a gas turbine engine having a first fuel line delivering fuel to a combustion chamber, a second fuel line, and a control arrangement producing a pressure signal in the second fuel line at one of a predetermined number of pressure levels.

BRIEF DESCRIPTION OF THE DRAWINGS

These aspects of the invention and others will be better understood after a reading of the following detailed description of the invention together with the following drawings, wherein.

DETAILED DESCRIPTION

Figure 1:
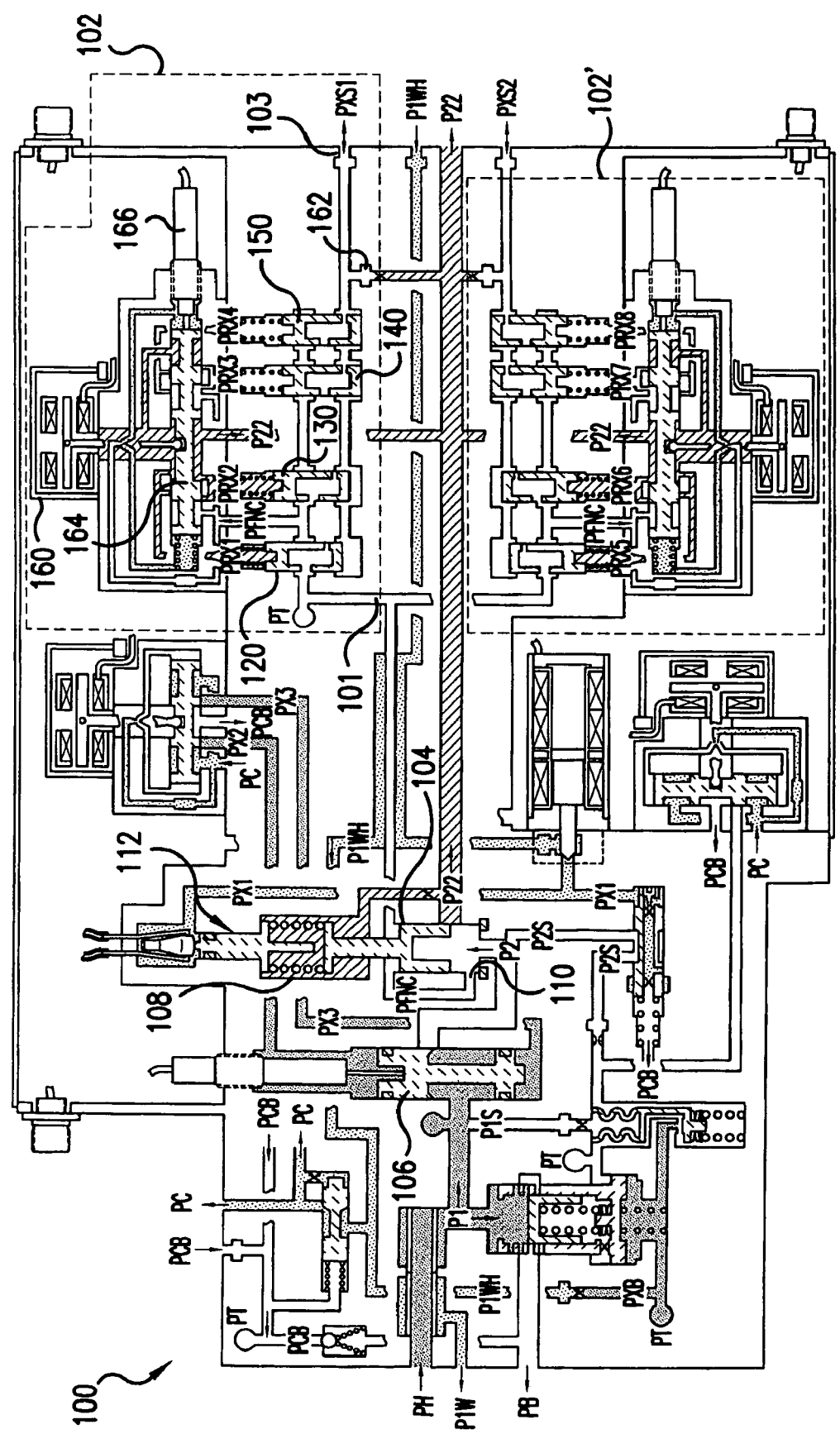
FIG. 1 is schematic view of a fuel control system according to a first embodiment of the present invention that includes a pressure control regulating portion having an EHSV with a spool.

Referring now to the drawings, wherein the showings are for purposes of illustrating embodiments of the invention only, and not for the purpose of limiting same, FIG. 1 is a schematic diagram of a fuel control system 100 which includes a fuel nozzle pressure control section 102 having an input 101 at which fuel at pressure PFNC enters section 102 and an outlet 103 at which pressure PXS1 is produced. Sections 102 and 102' provide a mechanism to establish and control two separate signal pressures (PXS1 and PXS2) at any one of five discrete levels relative to fuel manifold pressure (P22), ranging from zero to 267 psid and specifically in the present example, discrete levels of 0, 95, 159, 217 and 266 psid. Of course, the invention could be used to provide a single pressure signal or three or more pressure signals. Alternately, the number of pressure levels may be more or less than five and the pressure levels may be different than those described herein without departing from the scope of the invention.

A pressurizing valve 104 supplies a muscle pressure (PFNC) to the nozzle control system 102 which is a minimum of 300 psid above fuel manifold pressure (P22) at all flowing conditions. The pressurizing valve 104 operates on a pressure difference between the discharge pressure (P2) of metering valve 106 and P22, acting on the rod diameter of pressurizing valve 104 and working against a load spring 108. The valve rod diameter, valve porting and load spring 108 are selected such that P2 is not opened or "cracked" to pressure P22 until the difference between P2 and P22 exceeds 300 psid. At this cracking condition, and at subsequent higher pressure differences, P2 is opened to PFNC via port 110 in pressurizing valve 104. Thus at all flowing conditions, i.e. P2 opened to P22, PFNC is open and essentially equal to P2, establishing a 300 psid differential pressure between PFNC and P22.

Valve 104 is closed by porting a high pressure signal (PX1) to the backside of a shutoff piston 112. When this is done, the force exerted by the PX1-to-P22 pressure differential acting on the shutoff piston 112 area exceeds the spring load and the force of P2-to-P22 pressure differential on the pressurizing valve rod diameter. This forces the valve 104 closed against the sealing shutoff seat. In this position, fuel flow is positively shutoff to both PFNC and P22.

In this embodiment, the fuel control 100 contains two separate but identical PXS pressure control systems, a first pressure control system 102 producing a first control pressure PXS1 and a second control system 102' producing a second control pressure PXS2. For simplicity, only the first pressure control system 102 will be described. The second system 102' operates in an identical manner.

The first pressure control system 102 comprises four pressure regulators, namely a first pressure regulator 120, a second pressure regulator 130, a third pressure regulator 140 and a fourth pressure regulator 150 as well as a six-way electro-hydraulic servo-valve (EHSV) 160 that controls activation of the pressure regulators 120, 130, 140, 150, and a reference PXS1 bleed 162. First pressure regulator 120 includes a piston 122 having a first side 124, a second side 126, a supply port 127 and a metering port 128; second regulator 130 includes a piston 132 having a first side 134, a second side 136, a supply port 137 and a metering port 138; third regulator 140 includes a piston 142 having a first side 144, a second side 146, a supply port 147 and a metering port 148; and fourth regulator 150 includes a piston 152 having a first side 154, a second side 156, a supply port 157 and a metering port 158. While the pistons, piston sides and supply and metering ports are visible in FIG. 1, for clarity, they are only labeled in the detail view of FIGS. 2-6.

For purposes of description herein, a pressure regulator, such as second pressure regulator 130, may be described as being located "between" inlet 101 and outlet 103. In this description, pressure regulator 130 is between inlet 101 and outlet 103 because a flow path extends from inlet 101 through pressure regulator 130 to outlet 103. The fact that other flow paths may exist that do not pass through regulator 130 does not affect this definition.

When activated, each of the regulators 120, 130, 140, 150 controls the pressure difference between PXS1 and P22 and sets this pressure difference to one of five discrete levels. The pressure at which each regulator regulates is sometimes referred to herein as a "valve pressure" to distinguish from pressures elsewhere in the system. The regulators 120, 130, 140, 150 are controlled by applying either nozzle control muscle pressure (PFNC) or nozzle pressure P22 to the first or spring side of each regulator. When nozzle pressure P22 is applied to the first sides of the valves, the respective PFNC supply ports are opened. The regulators are successively triggered, beginning with regulator 120 when PRX1 is opened to P22 by the EHSV 160.

Figure 2:
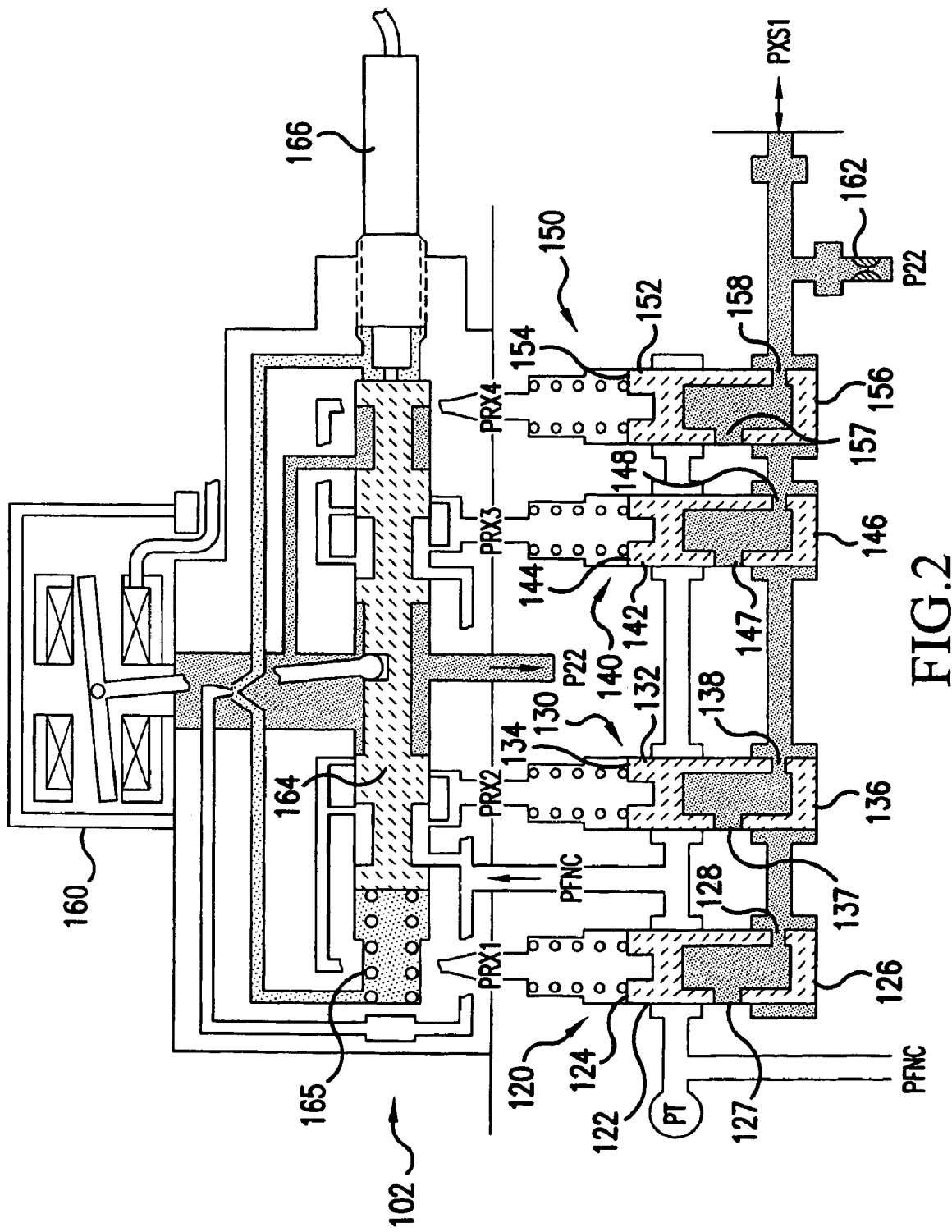
FIG. 2 is a detail view of the regulating portion of FIG. 1 showing the spool in a first position.
Figure 3:
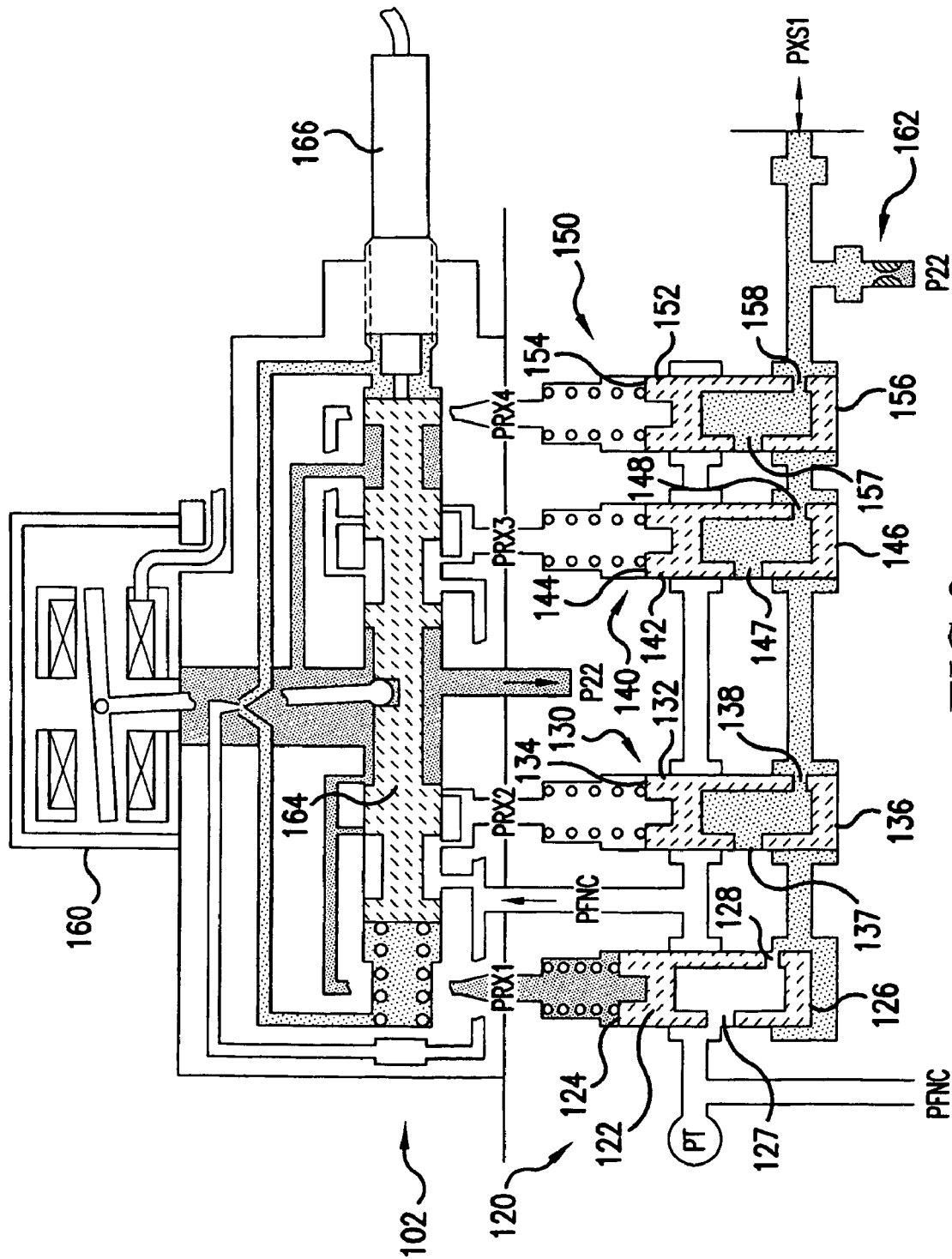
FIG. 3 is a detail view of the regulating portion of FIG. 1 showing the spool in a second position.
Figure 4:
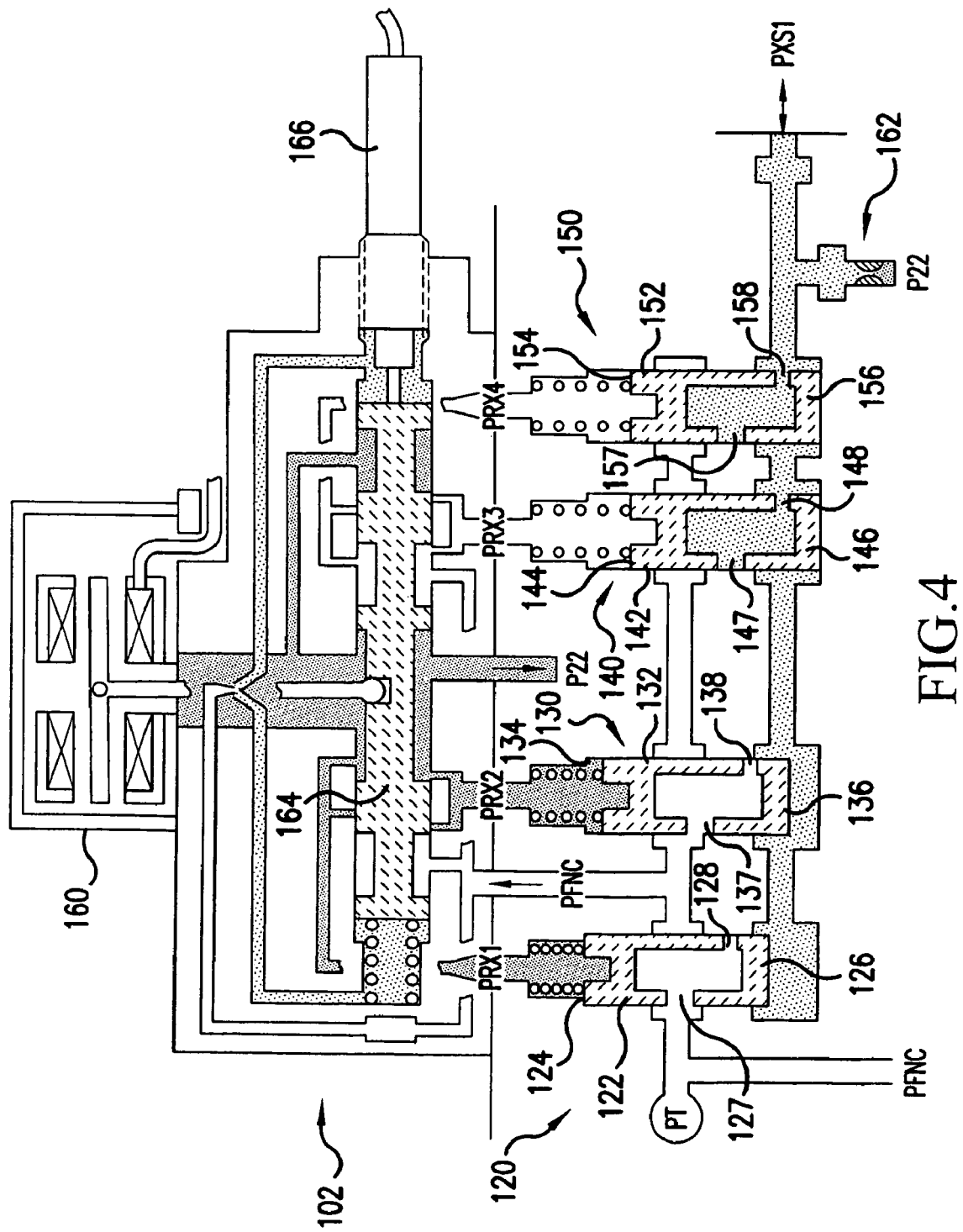
FIG. 4 is a detail view of the regulating portion of FIG. 1 showing the spool in a third position.

FIGS. 2-6 further illustrate the operation of the fuel nozzle pressure control system by depicting the system at each of the five operating modes, with EHSV spool 164 in five different positions, beginning with the zero psid case shown in FIG. 2. As the spool 164 travels from right to left in the figures, the four regulators are activated in turn by closing off the PFNC supply to the respective regulator spring side PRX pressure and opening it to P22 via timed ports in the spool sleeve. Closed loop feedback of the operating mode is available via an LVDT 166 which is connected to and indicates position of the EHSV spool 164.

Figure 5:
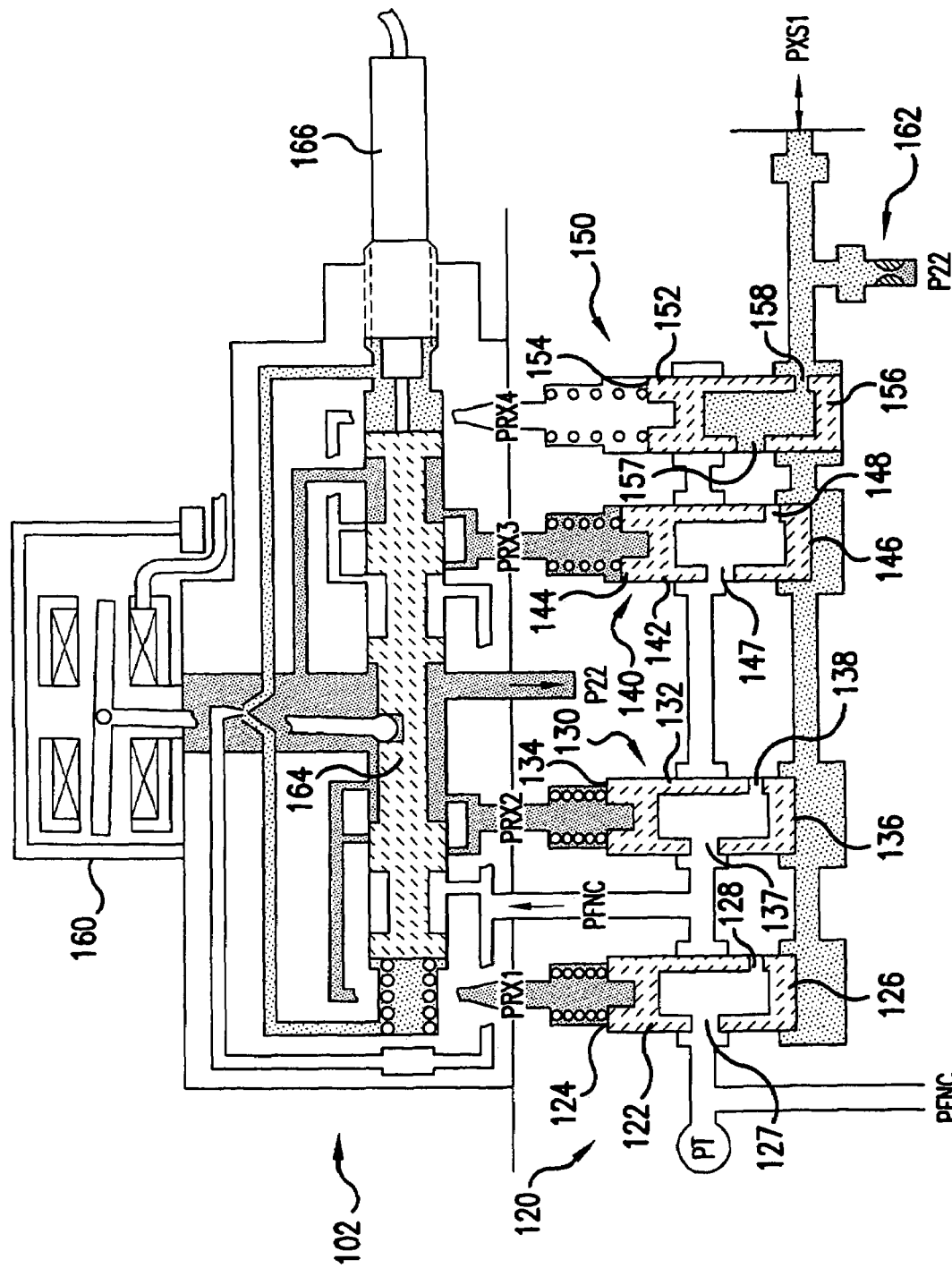
FIG. 5 is a detail view of the regulating portion of FIG. 1 showing the spool in a fourth position.
Figure 6:
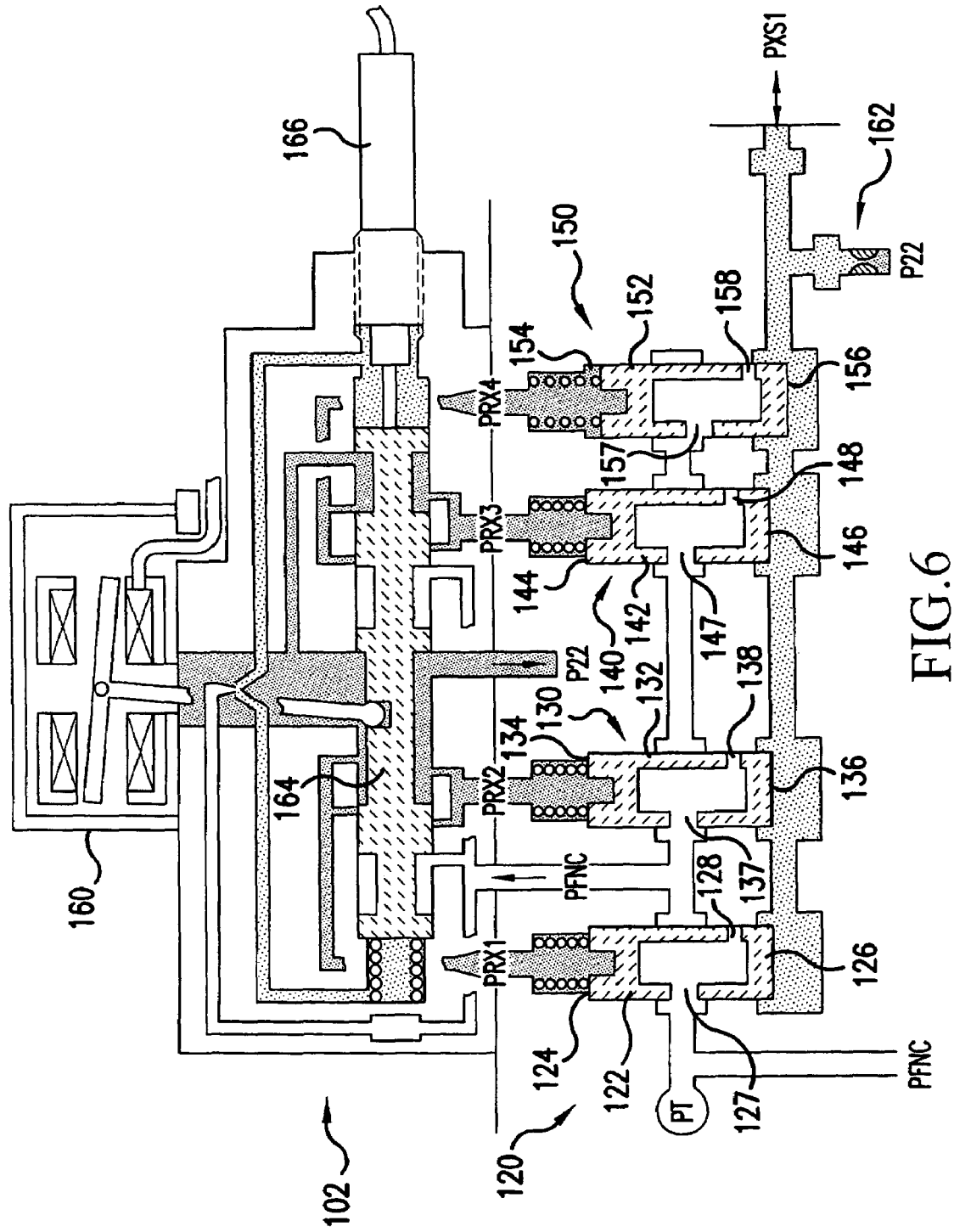
FIG. 6 is a detail view of the regulating portion of FIG. 1 showing the spool in a fifth position.

As seen in FIG. 2, when pressure PFNC is applied to all four regulators 120, 130, 140 and 150, all regulators are closed and there is no pressure difference between P22 and PXS1. When spool 164 moves to the position shown in FIG. 3, the flow path from PFNC to first side 124 of first pressure regulator 120 is blocked, a flow path from PRX1 to P22 is opened, and first pressure regulator 120 is activated and regulates at 95 psid PXS1-to-P22. When the flow path from PFNC to regulator 130 is blocked and PRX2 is opened to P22, second regulator 130 begins to operate and regulate at 159 psid. This higher pressure is also applied against the output of first pressure regulator 120. Because first pressure regulator 120 regulates at a lower pressure, it is driven into the inactive, full retract stop, position illustrated in FIG. 4, thereby covering its PFNC-to-PXS1 metering port 128. Subsequent activation of regulator 140 (217 psid) and regulator 150 (267 psid) have the same effect on the lower pressure pressure regulators, as shown in FIGS. 5 and 6. The system is designed such that a maximum of one regulator is active at any given time. In the shutoff case, or PXS1-P22=0 psid, shown in FIG. 2, all regulators are deactivated by porting PFNC to all four PRX pressures. The reference PXS1 bleed 162 is sized to provide sufficient flow from PXS1 to P22 for stable regulation at all operating cases.

Figure 7:
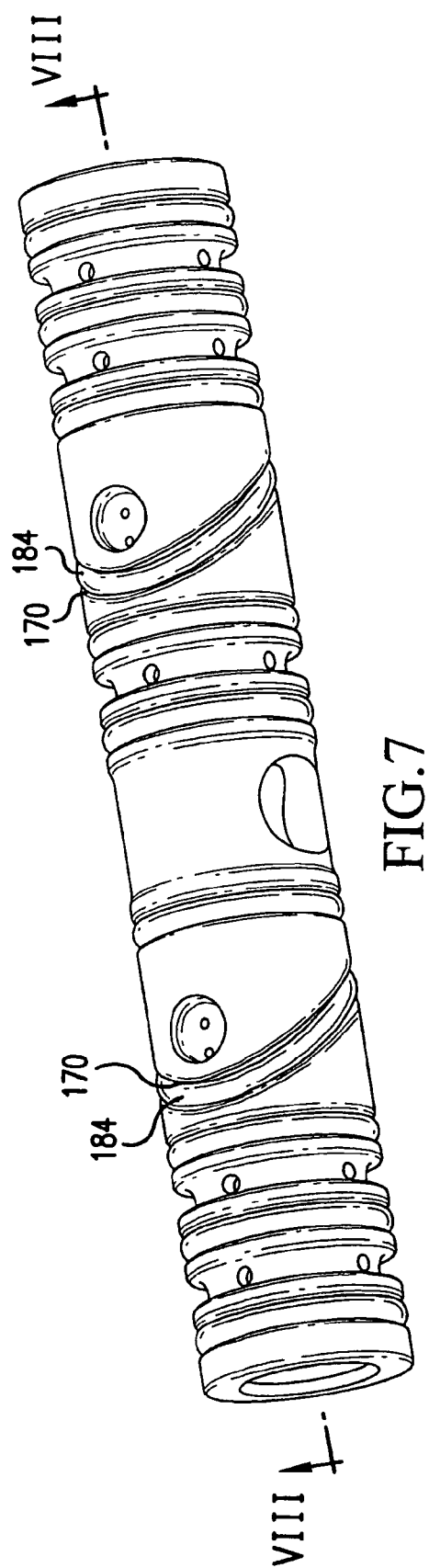
FIG. 7 is a perspective view of a sleeve that encompasses the spool of FIG. 1.
Figure 8:
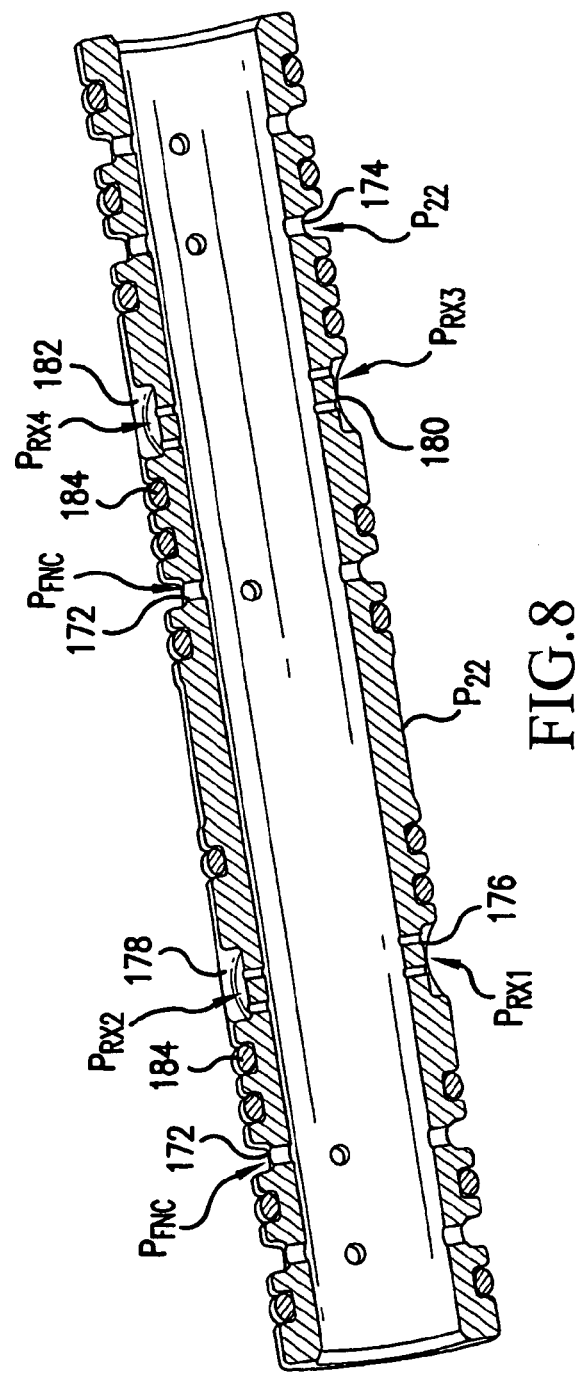
FIG. 8 is a sectional elevation view taken through line VIII-VIII in FIG. 7.

The porting configuration in the EHSV second stage spool sleeve 164 is depicted in FIGS. 7 and 8 and includes ports 172 to pressure PFNC, ports 174 to pressure P22, ports 176 to pressure PRX1, ports 178 to pressure PRX2, ports 180 to pressure PRX3 and ports 182 to a pressure PRX4. The use of O-ring seals 184 installed in diagonal grooves 170 relative to the sleeve centerline allows two separate PRX channels to be axially located in close proximity, and one set of spool edges to control the porting of these two PRX pressures, thus minimizing part length and the amount of spool stroke required in the EHSV second stage. Two diagonal seals are employed, one separating PRX1 from PRX2, the other separating PRX3 from PRX4. As depicted in FIG. 2, A load spring 165 places a force that biases spool 164 to the right most position during engine start up, shut down, or a failed EHSV hydraulic supply or electrical signal, resulting in the desired mode of operation for these conditions.

Figure 9:
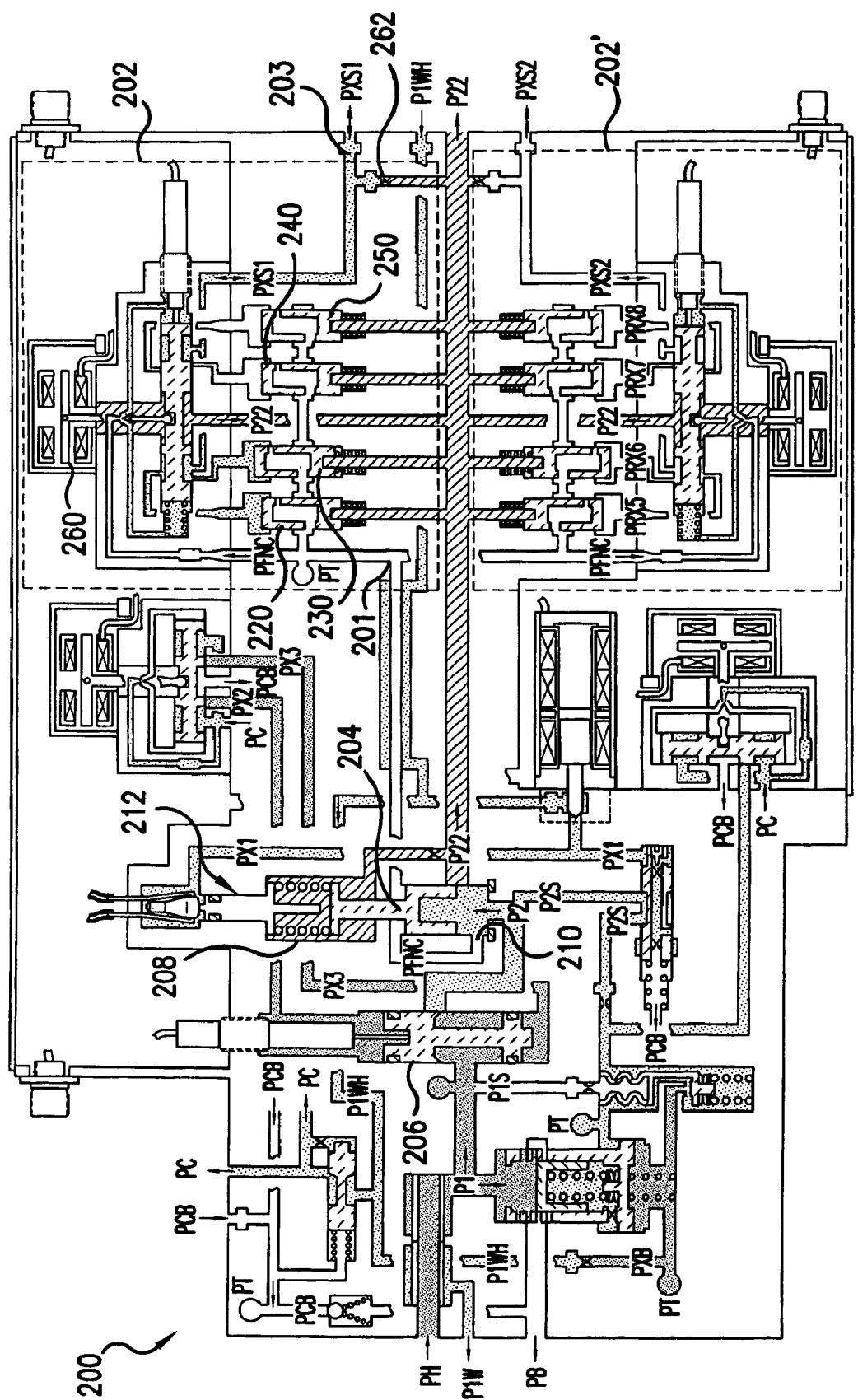
FIG. 9 is schematic view of a fuel control system according to a second embodiment of the present invention that includes a pressure control regulating portion having an EHSV with a spool.
Figure 10:
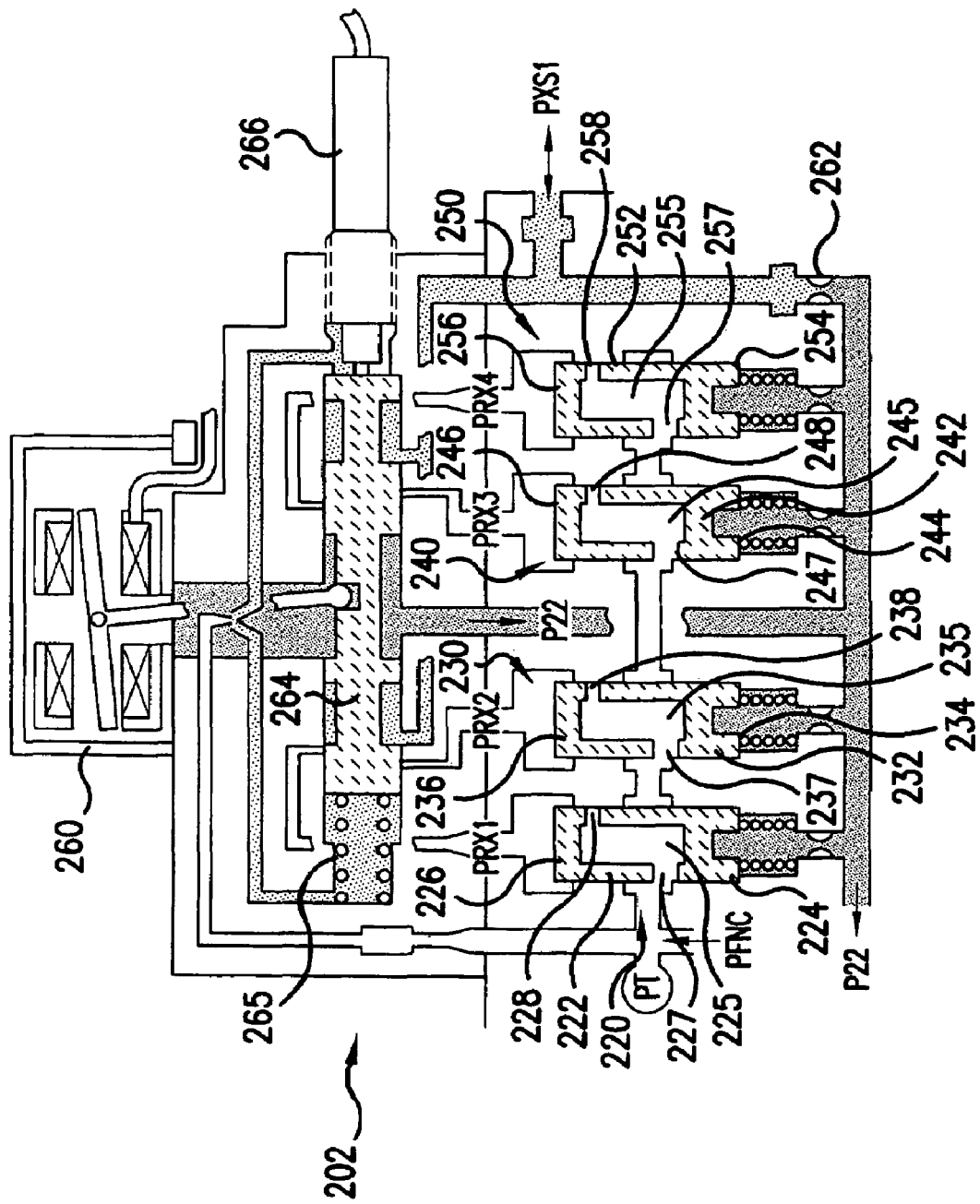
FIG. 10 is a detail view of the regulating portion of FIG. 9 showing the spool in a first position.

FIG. 9 is a schematic diagram of a fuel control system 200 according to a second embodiment of the invention. Fuel control system 200 includes a fuel nozzle pressure control section 202 having an inlet 201 and an outlet 203 at which a pressure PXS1 is produced. Sections 202 and 202' provide a mechanism to establish and control two separate signal pressures (PXS1 and PXS2) at any one of five discrete levels relative to fuel manifold pressure (P22), ranging from zero to 267 psid and specifically in the present example, discrete levels of 0, 95, 159, 217 and 266 psid.

A pressurizing valve 204 supplies a muscle pressure (PFNC) to the nozzle control system 202 which is a minimum of 300 psid above fuel manifold pressure (P22) at all flowing conditions. The pressurizing valve 204 operates on a pressure difference between the discharge pressure (P2) of metering valve 206 and P22, acting on the rod diameter of pressurizing valve 204 and working against a load spring 208. The valve rod diameter, valve porting and load spring 208 are selected such that P2 is not opened or "cracked" to pressure P22 until the difference between P2 and P22 exceeds 300 psid. At this cracking condition, and at subsequent higher pressure differences, P2 is opened to PFNC via port 210 in pressurizing valve 204. Thus at all flowing conditions, i.e. P2 opened to P22, PFNC is open and essentially equal to P2, establishing a 300 psid differential pressure between PFNC and P22.

Valve 204 is closed by porting a high pressure signal (PX1) to the backside of a shutoff piston 212. When this is done, the force exerted by the PX1-to-P22 pressure differential acting on the shutoff piston 212 area exceeds the spring load and the force of P2-to-P22 pressure differential on the pressurizing valve rod diameter. This forces the valve 204 closed against the sealing shutoff seat. In this position, fuel flow is positively shutoff to both PFNC and P22.

In this embodiment, the fuel control 200 contains two separate but identical PXS pressure control systems, a first pressure control system 202 producing a first control pressure PXS1 and a second control system 202' producing a second control pressure PXS2. For simplicity, only the first pressure control system 202 will be described (the second system 202' operating in an identical manner).

The first pressure control system 202 comprises four pressure regulators, namely a first pressure regulator 220, a second pressure regulator 230, a third pressure regulator 240 and a fourth pressure regulator 250 as well as a six-way EHSV 260 that controls activation of the pressure regulators 220, 230, 240, 250. First pressure regulator 220 includes a piston 222 having a first side 224, a middle metering area 225, a second or control side 226, a supply port 227 and a metering port 228; second regulator 230 includes a piston 232 having a first side 234, a middle metering area 235, a second or control side 236, a supply port 237 and a metering port 238; third regulator 240 includes a piston 242 having a first side 244, a middle metering area 245, a second or control side 246, a supply port 247 and a metering port 248; and fourth regulator 250 includes a piston 252 having a first side 254, a middle metering area 255, a second or control side 256, a supply port 257 and a metering port 258. While the pistons, middle metering areas, piston sides and supply and metering ports are visible in FIG. 9, for clarity, they are only labeled in the detail views of FIGS. 10-14.

In this embodiment, pressure P22 is applied against the first sides 224, 234, 244, 254 of regulators 220, 230, 240, 250, and the position of each regulator depends on whether a flow path is open between second sides 226, 236, 246, 256 and outlet PXS1. When activated, each of the regulators 220, 230, 240, 250 controls the pressure difference between PXS1 and P22 setting this pressure difference to one of the five discrete levels or operating modes. As the EHSV spool 264 travels from right to left in the figure, the four regulators are activated in turn by opening the control or second side 226, 236, 246, 256 of each regulator to PXS1. The reference PXS1 bleed 262 is sized to provide sufficient flow from PXS1 to P22 for stable regulation at all operating cases.

FIGS. 10-14 show spool 264 of EHSV 260 in five different positions corresponding to five different levels of control pressure PXS1. In the shutoff case, shown in FIG. 10, all flow paths from the regulators 220, 230, 240, 250 to PRX1 are substantially blocked by spool 264. However, because leakage from PFNC to the control sides (second sides 226, 236, 246 and 256) of regulators 220, 230, 240, 250 significantly exceeds leakage from the control sides to PXS1, the pressures PRX1, PRX2, PRX3 and PRX4 between control sides 226, 236, 246 and 256 are essentially equal to PFNC in the shutoff case. The PFNC to P22 pressure differential moves the regulators against the spring load to a retract hard stop position. In the shutoff case PXS1 equals P22. A load spring 265 places a force that biases spool 264 to the right most position during engine start up, shut down, or a failed EHSV hydraulic supply or electrical signal, resulting in the desired mode of operation for these conditions.

Figure 11:
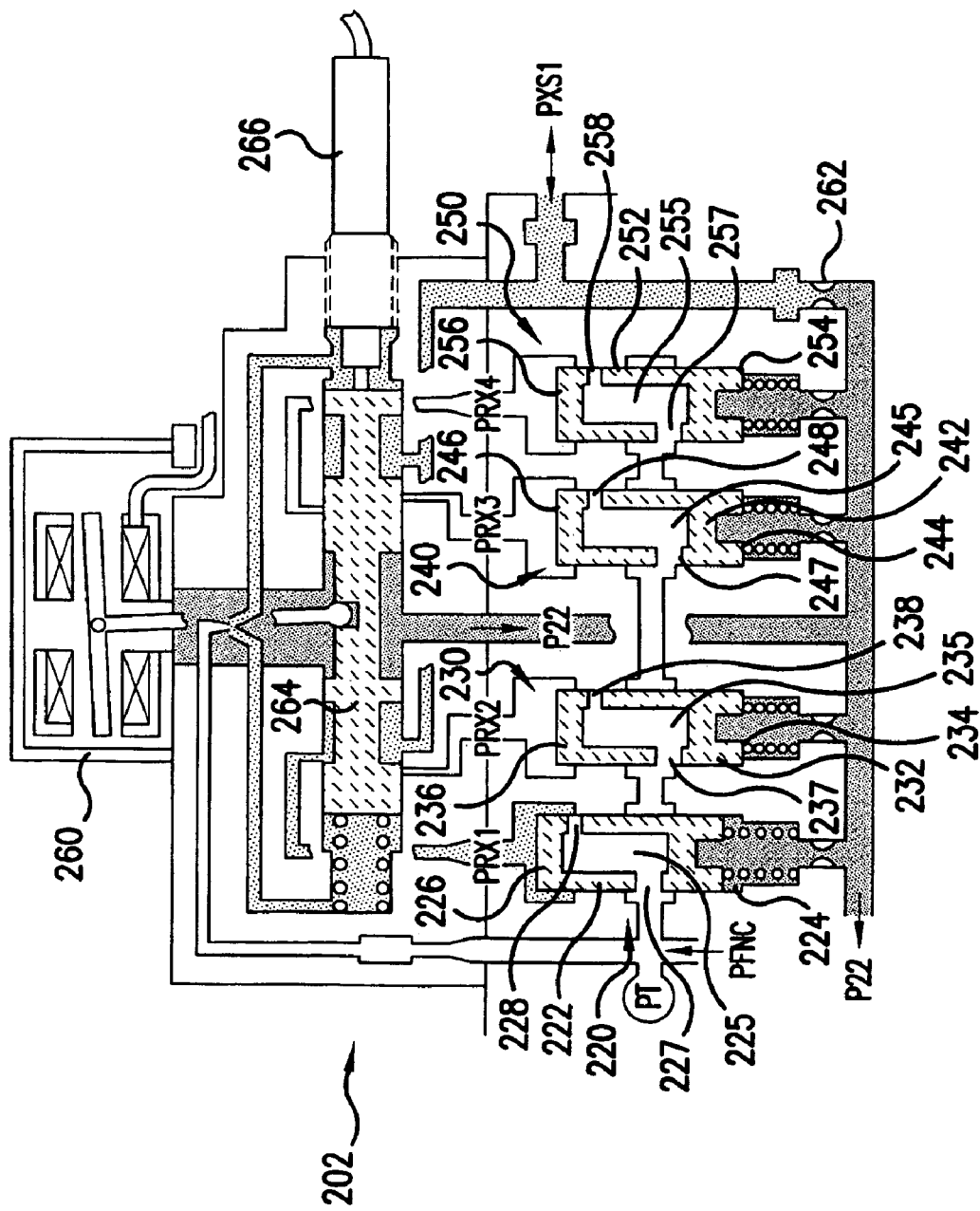
FIG. 11 is a detail view of the regulating portion of FIG. 9 showing the spool in a second position.

In FIG. 11, spool 264 is moved to a second position in which a pathway is opened between control side 226 and PXS1. This allows PFNC to flow through middle metering area 225 of regulator 220 and through metering port 228 at a regulated pressure, in this embodiment, of 95 psi above P22.

Figure 12:
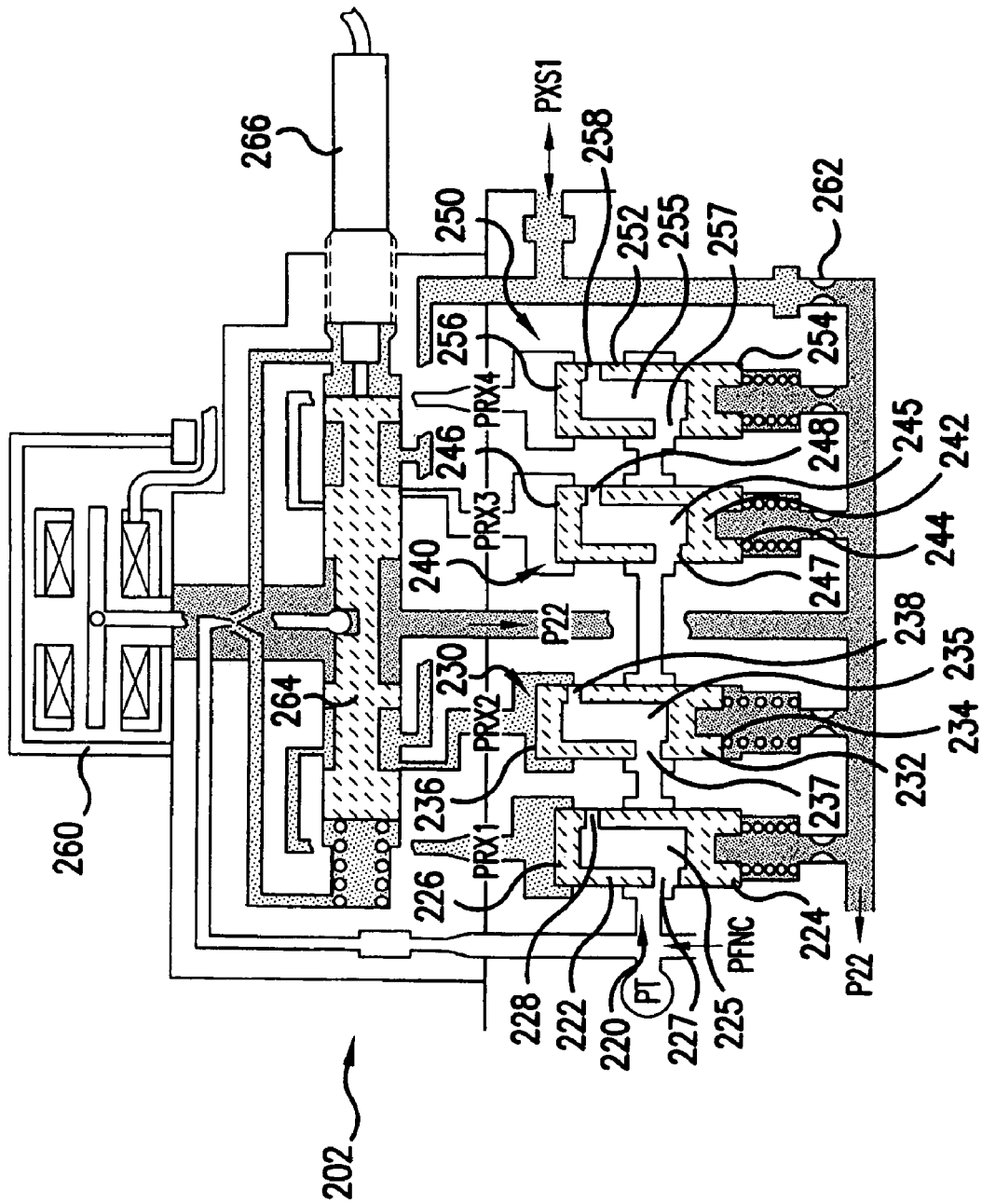
FIG. 12 is a detail view of the regulating portion of FIG. 9 showing the spool in a third position.

In FIG. 12, spool 264 is in a third position in which a pathway is opened between control side 236 of second regulator 230 and to PXS1. This allows PFNC to flow through middle metering area 235 of regulator 230 and through metering port 238 at a regulated pressure, in this embodiment, of 159 psi above P22. This higher pressure is also presented to control side 226 of first regulator 220 which closes first regulator 220. (The system of this embodiment is designed so that no more than one pressure regulator is active at any time.)

Figure 13:
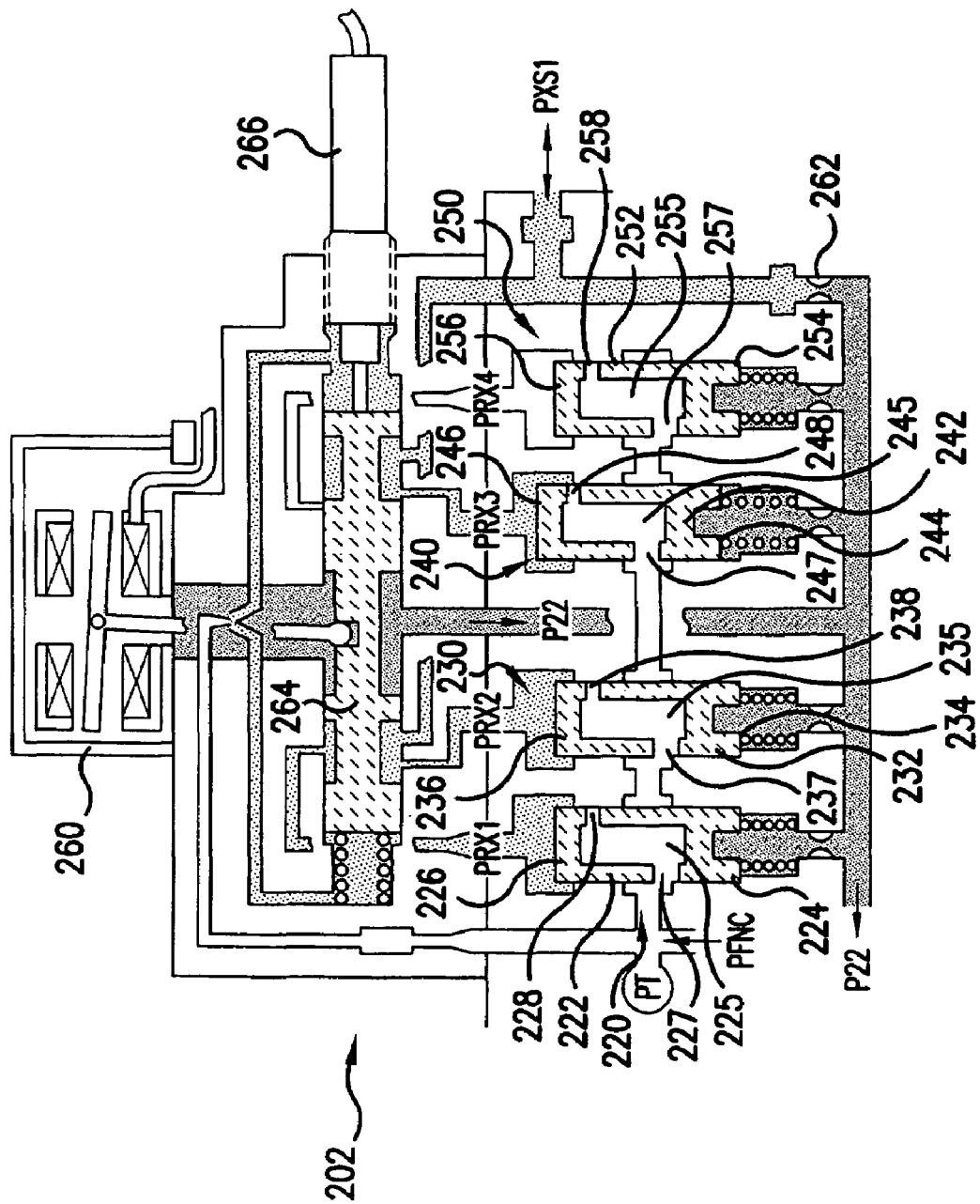
FIG. 13 is a detail view of the regulating portion of FIG. 9 showing the spool in a fourth position.

In FIG. 13, spool 264 is in a fourth position in which a pathway is opened between control side 246 of third regulator 240 and PXS1. This allows PFNC to flow through middle metering area 245 of regulator 240 and through metering port 248 at a regulated pressure, in this embodiment, of 217 psi above P22. This higher pressure is also presented to control side 226 of first regulator 220 and control side 236 of second regulator 230 which closes first regulator 220 and second regulator 230.

Figure 14:
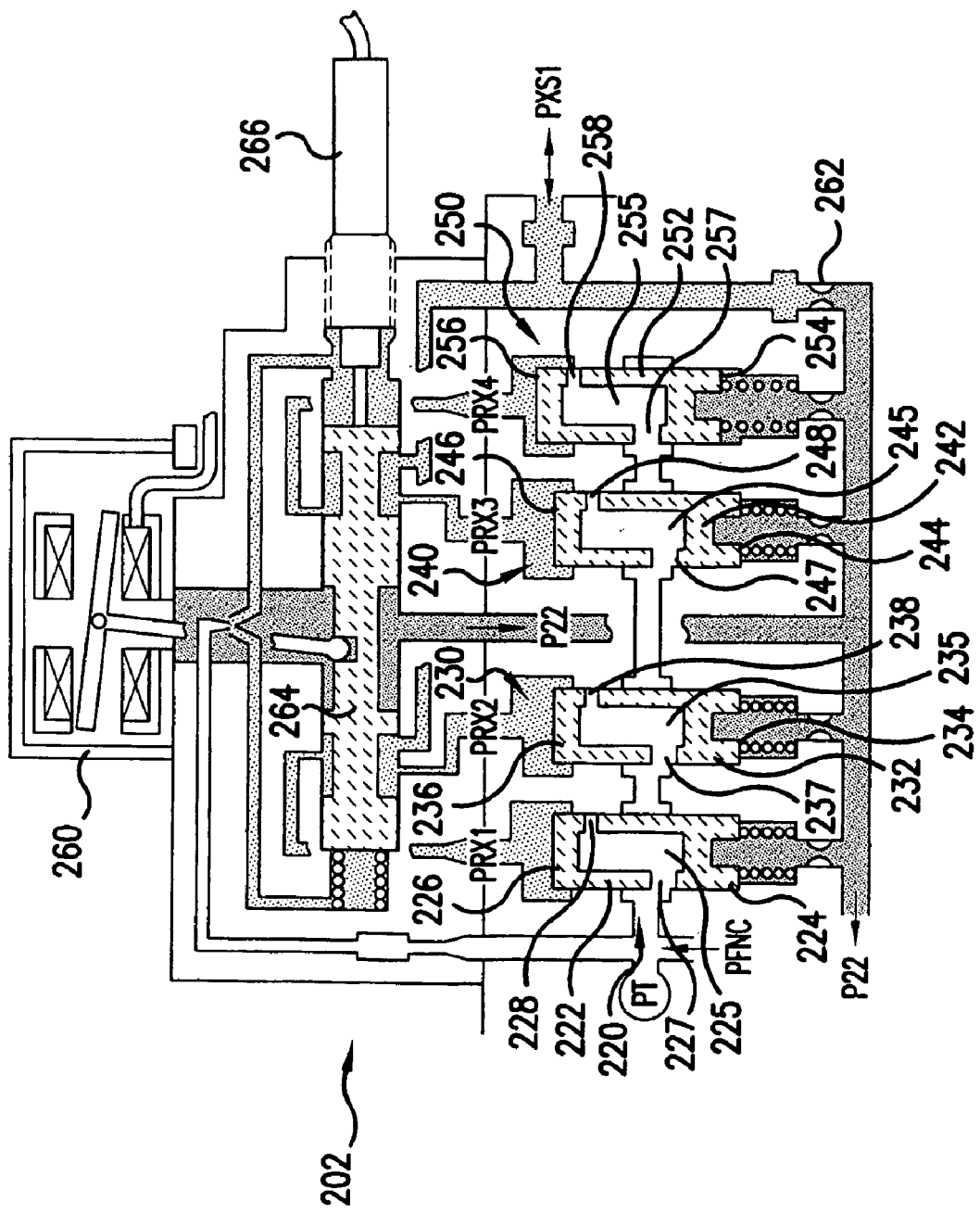
FIG. 14 is a detail view of the regulating portion of FIG. 9 showing the spool in a fifth position.
Figure 15:
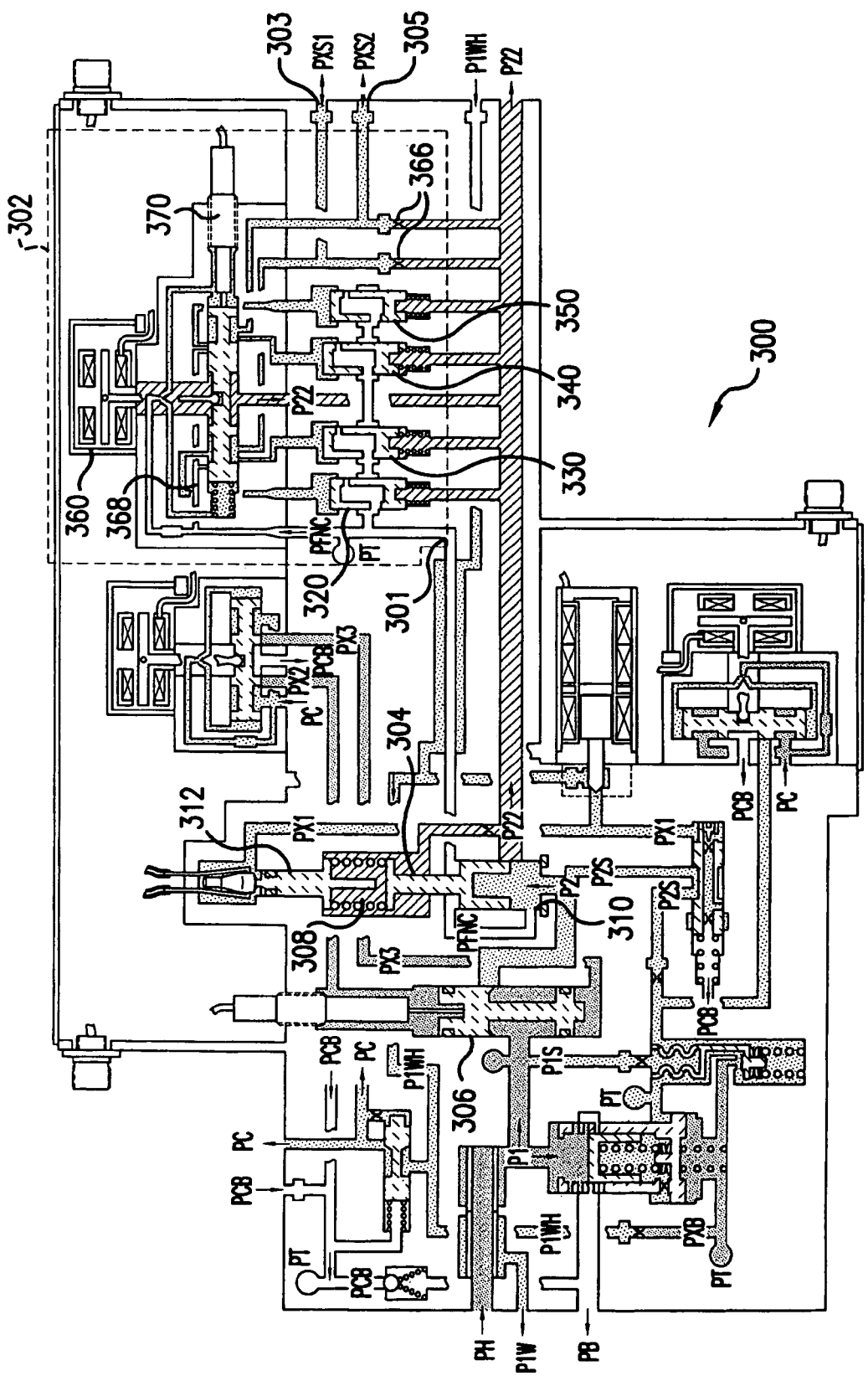
FIG. 15 is schematic view of a fuel control system according to a third embodiment of the present invention that includes a pressure control regulating portion having an EHSV with a spool.

In FIG. 14, spool 264 is in a fifth position in which a pathway is opened between control side 256 of fourth regulator 250 and PXS1. This allows PFNC to flow through middle metering area 255 of regulator 250 and through metering port 258 at a regulated pressure, in this embodiment, of 266 psi above P22. This higher pressure is also presented to control side 226 of first regulator 220, control side 236 of second regulator 230, and control side 246 of third regulator 240 which closes first regulator 220, second regulator 230, and third regulator 240.

A third embodiment of the present invention includes a valve arrangement illustrated in FIGS. 15-22 which provides first and second control pressures using a single set of valves. In this embodiment, a fuel control system 300 includes a fuel nozzle pressure control section 302 having an inlet 301 and first and second outlets 303, 305 at which pressures PXS1 and PXS2 are produced. Section 302 provides a mechanism to establish and control two separate signal pressures PXS1 and PXS2. First signal pressure PXS1 is set at any one of four discrete levels relative to fuel manifold pressure P22, ranging from zero to about 250 psid and specifically in the present example, discrete levels of 0, 95, 159 and 250 psid. Second signal pressure PXS2 is dependent on first signal pressure PXS1 and may take on values equal to or one step lower than first signal pressure PXS1. In other words, the following output pressure combinations (PXS1, PXS2) are produced by this embodiment of the present invention: (0, 0), (95, 0), (95, 95), (159, 95), (159, 159), (250, 159) and (250, 250). These signal pressure combinations are useful, for example, in controlling elements that normally operate at the same pressure level but which preferably shift from one pressure level to another one element at a time to limit the dynamic impact to the system.

A pressurizing valve 304 supplies a muscle pressure PFNC to the nozzle control system 302 which is a minimum of 250 psid above fuel manifold pressure P22 at all flowing conditions. The pressurizing valve 304 operates on a pressure difference between the discharge pressure P2 of metering valve 306 and P22, acting on the rod diameter of pressurizing valve 304 and working against a load spring 308. The valve rod diameter, valve porting and load spring 308 are selected such that P2 is not opened or "cracked" to pressure P22 until the difference between P2 and P22 exceeds 250 psid. At this cracking condition and at subsequent higher pressure differences, P2 is opened to PFNC via port 310 in pressurizing valve 304. Thus at all flowing conditions, i.e. P2 opened to P22, PFNC is open and essentially equal to P2, establishing the necessary 250 psid differential pressure between PFNC and P22.

Valve 304 is closed by porting a high pressure signal PX1 to the backside of a shutoff piston 312. At this condition, the force exerted by the PX1-to-P22 pressure differential acting on the shutoff piston 312 area exceeds the spring load and the force of P2-to-P22 pressure differential on the pressurizing valve rod diameter, forcing the valve 304 closed against the sealing shutoff seat. In this position, fuel flow is positively shutoff to both PFNC and P22.

Pressure control system 302 comprises four pressure regulators, namely a first pressure regulator 320, a second pressure regulator 330, a third pressure regulator 340 and a fourth pressure regulator 350 as well as an eight-way EHSV 360 that controls activation of the pressure regulators 320, 330, 340, 350. First pressure regulator 320 includes a piston 322 having a first or control side 324, a middle metering area 325, a second side 326, a supply port 327 and a metering port 328; second regulator 330 includes a piston 332 having a first or control side 334, a middle metering area 335, a second side 336, a supply port 337 and a metering port 338; third regulator 340 includes a piston 342 having a first or control side 344, a middle metering area 345, a second side 346, a supply port 347 and a metering port 348; and fourth regulator 350 includes a piston 352 having a first or control side 354, a middle metering area 355, a second side 356, a supply port 357 and a metering port 358. While the pistons, middle metering areas, piston sides and supply and metering ports are visible in FIG. 15, for clarity, they are only labeled in the detail views of FIGS. 16-22.

Figure 16:
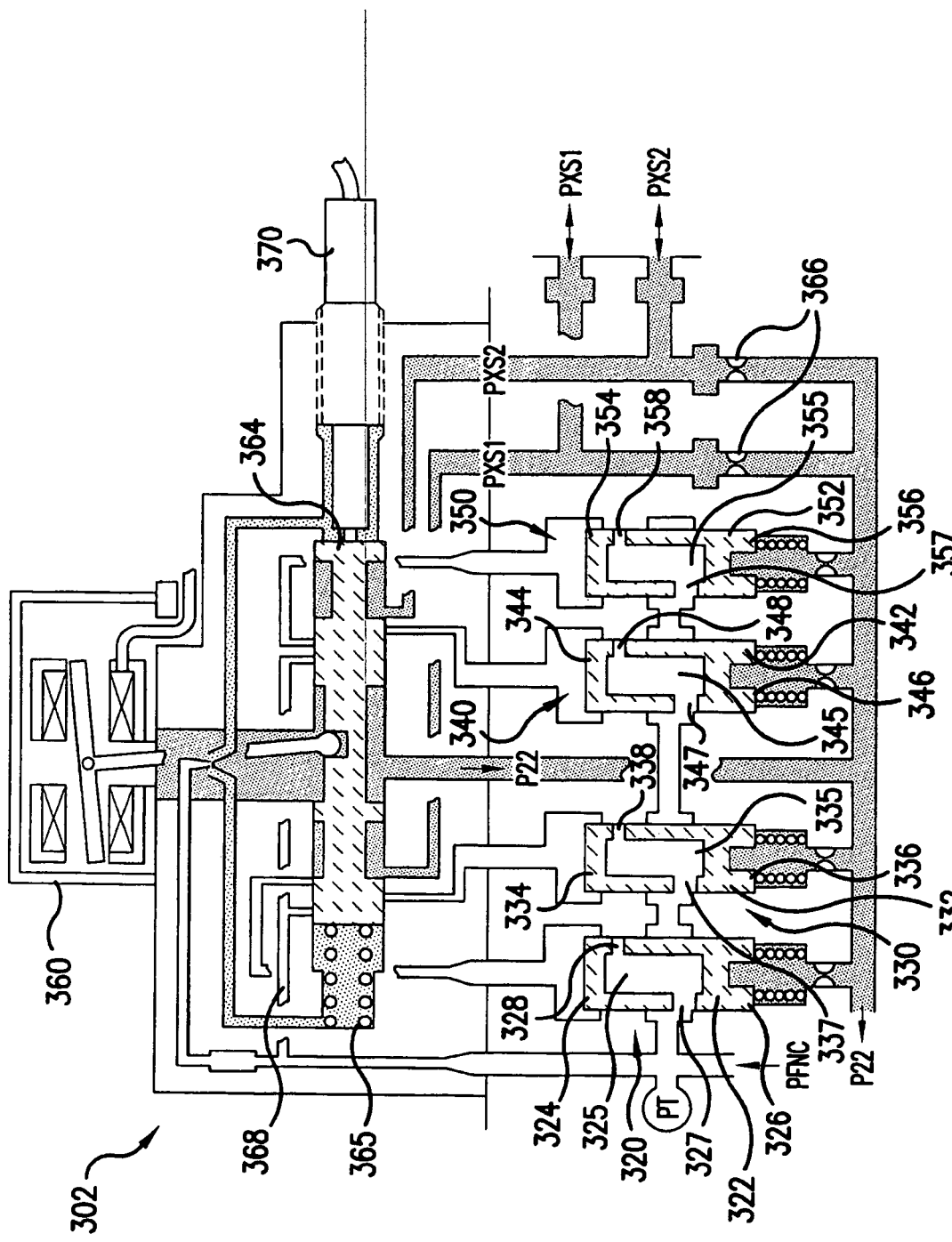
FIG. 16 is a detail view of the regulating portion of FIG. 15 showing the spool in a first position.

FIG. 16 illustrates the pressure control system 302 in a first state wherein PXS1 and PXS2 are equal to P22, or, in other words, the pressure difference between P22 and PXS1 is 0 and the pressure difference between PXS2 and P22 is 0In this configuration, the spool 364 of EHSV 360 blocks all flow paths leading away from regulators 320, 330, 340, 350 so that only pressure P22 is provided at PXS1 and PXS2 via bleeds 366. In this position, the leakage from PFNC to the control side of the regulators significantly exceeds leakage from the control side to PXS1 so that the pressure on the control side of each regulator is essentially equal to PFNC.

Figure 17:
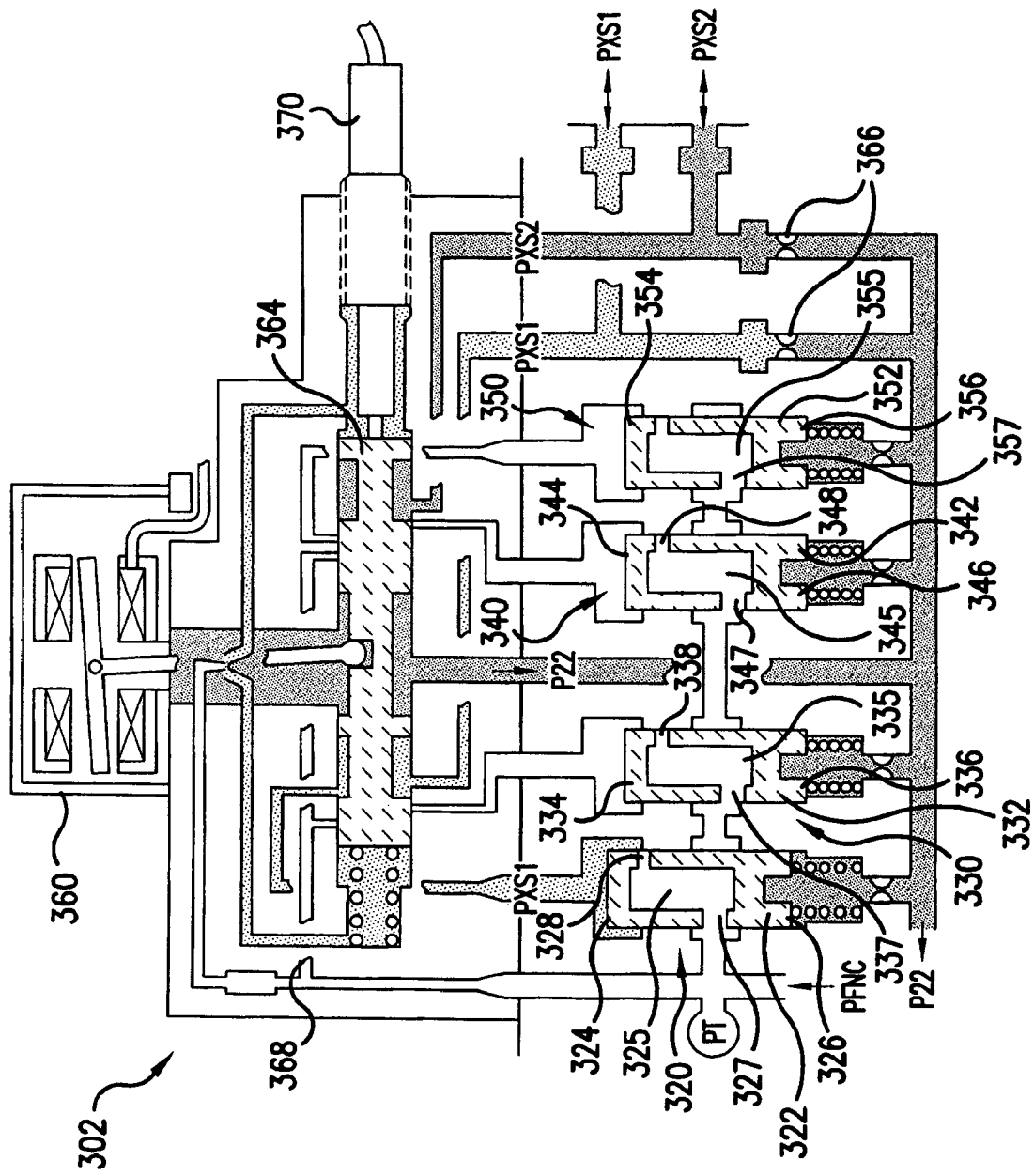
FIG. 17 is a detail view of the regulating portion of FIG. 15 showing the spool in a second position.

FIG. 17 illustrates spool 364 moved to a second position opening a flow path through first regulator 320 from PFNC to PXS1. First regulator 320 regulates at a pressure of 95 psid so that the pressure at PXS1 is 95 psi over the pressure P22.

Figure 18:
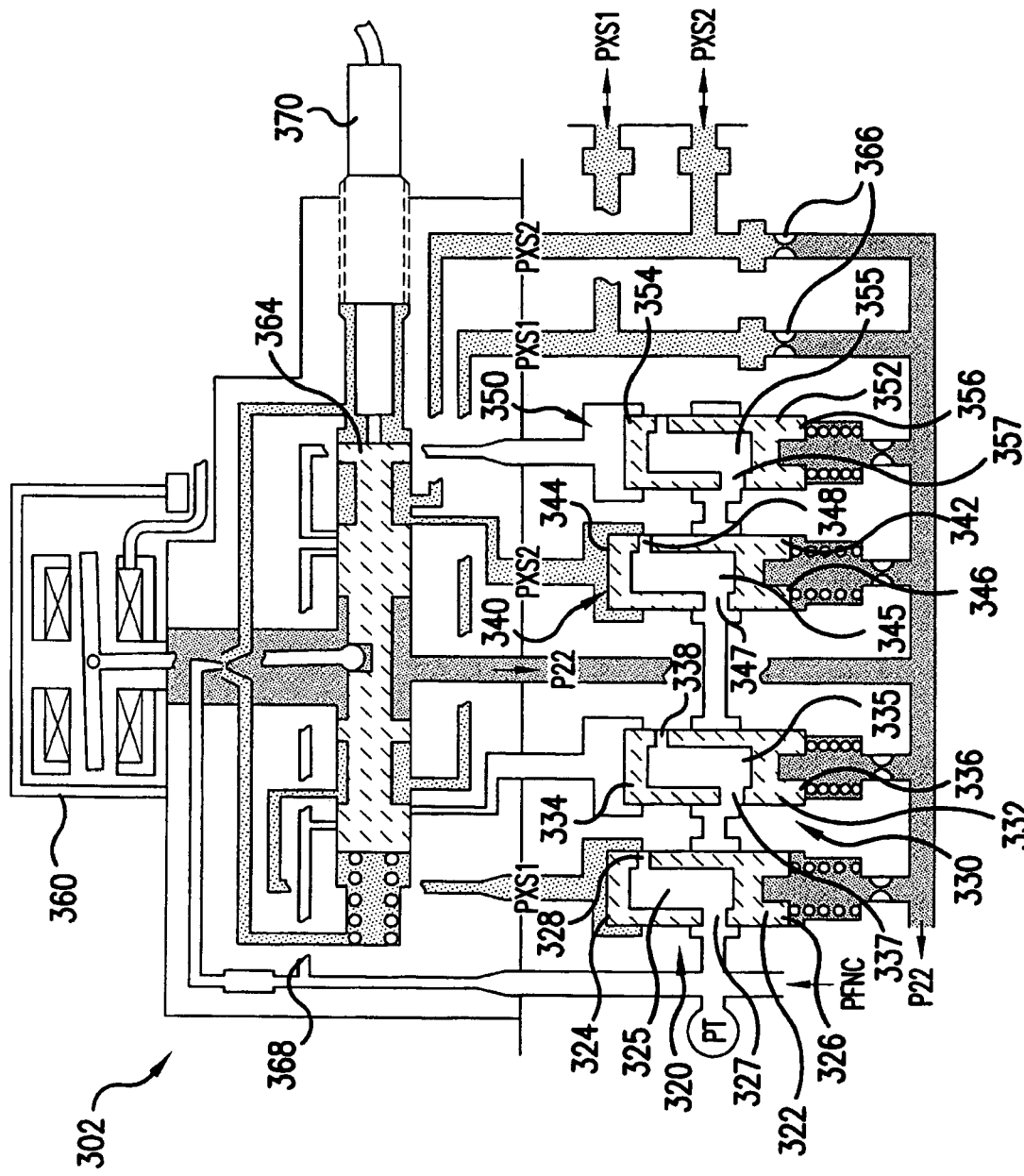
FIG. 18 is a detail view of the regulating portion of FIG. 15 showing the spool in a third position.

FIG. 18 illustrates spool 364 moved to a third position opening a second flow path through third regulator 340 from PFNC to PXS2. Third regulator 340 regulates at a pressure of 95 psid so that the pressure at PXS2 is 95 psi above pressure P22. In this position, first regulator 320 continues to supply a pressure of 95 psid to PXS1.

Figure 19:
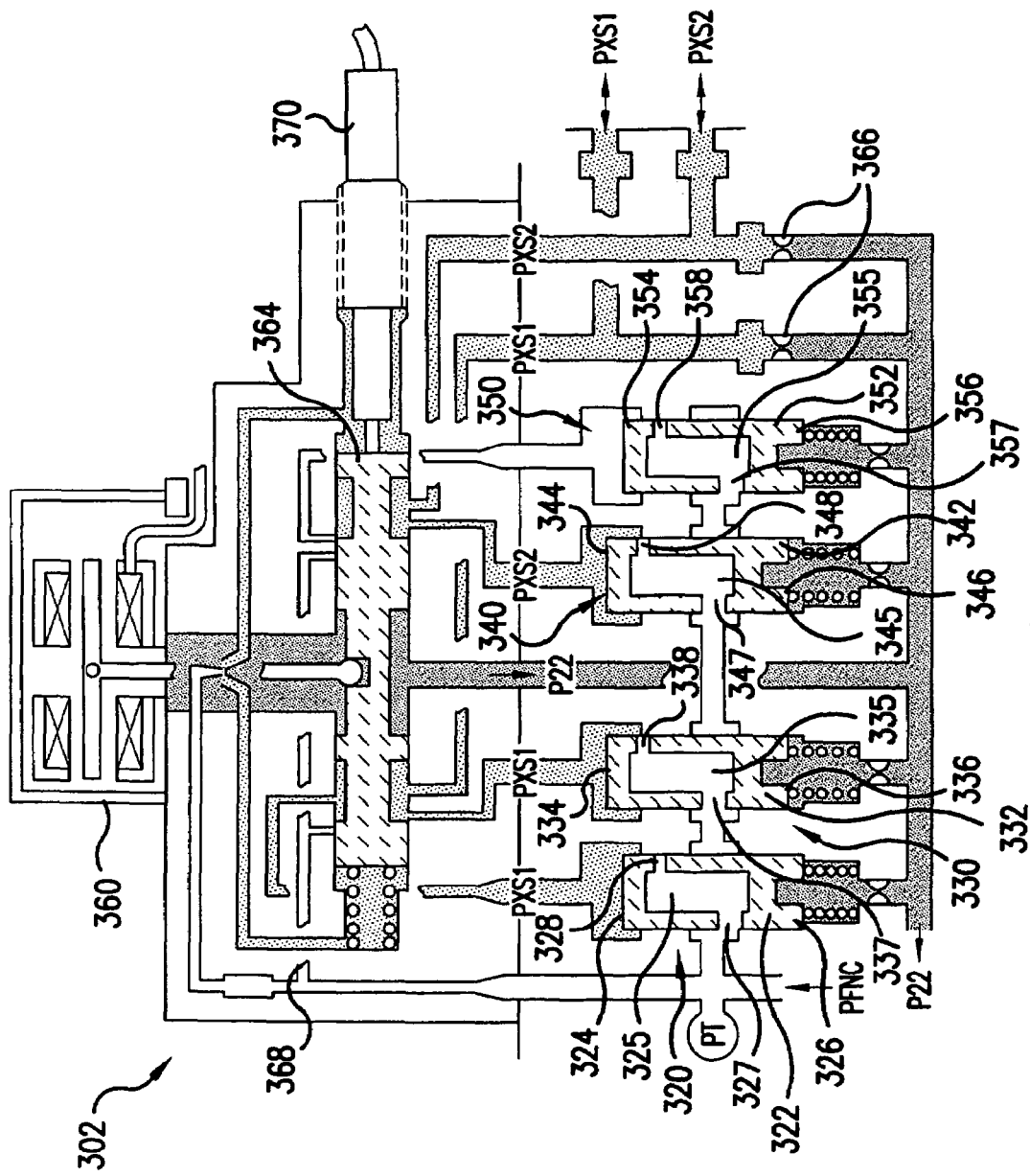
FIG. 19 is a detail view of the regulating portion of FIG. 15 showing the spool in a fourth position.

FIG. 19 illustrates spool 364 moved to a fourth position opening a flow path through second regulator 330 from PFNC to PXS1. Second regulator 330 regulates at a pressure of 159 psid and provides this pressure to PXS1. This pressure, being greater than the 95 psid at which first regulator 320 regulates, is applied against first side 324 of first regulator 320 and forces first regulator 320 against its biasing spring to its hard stop position, closing the first regulator.

Figure 20:
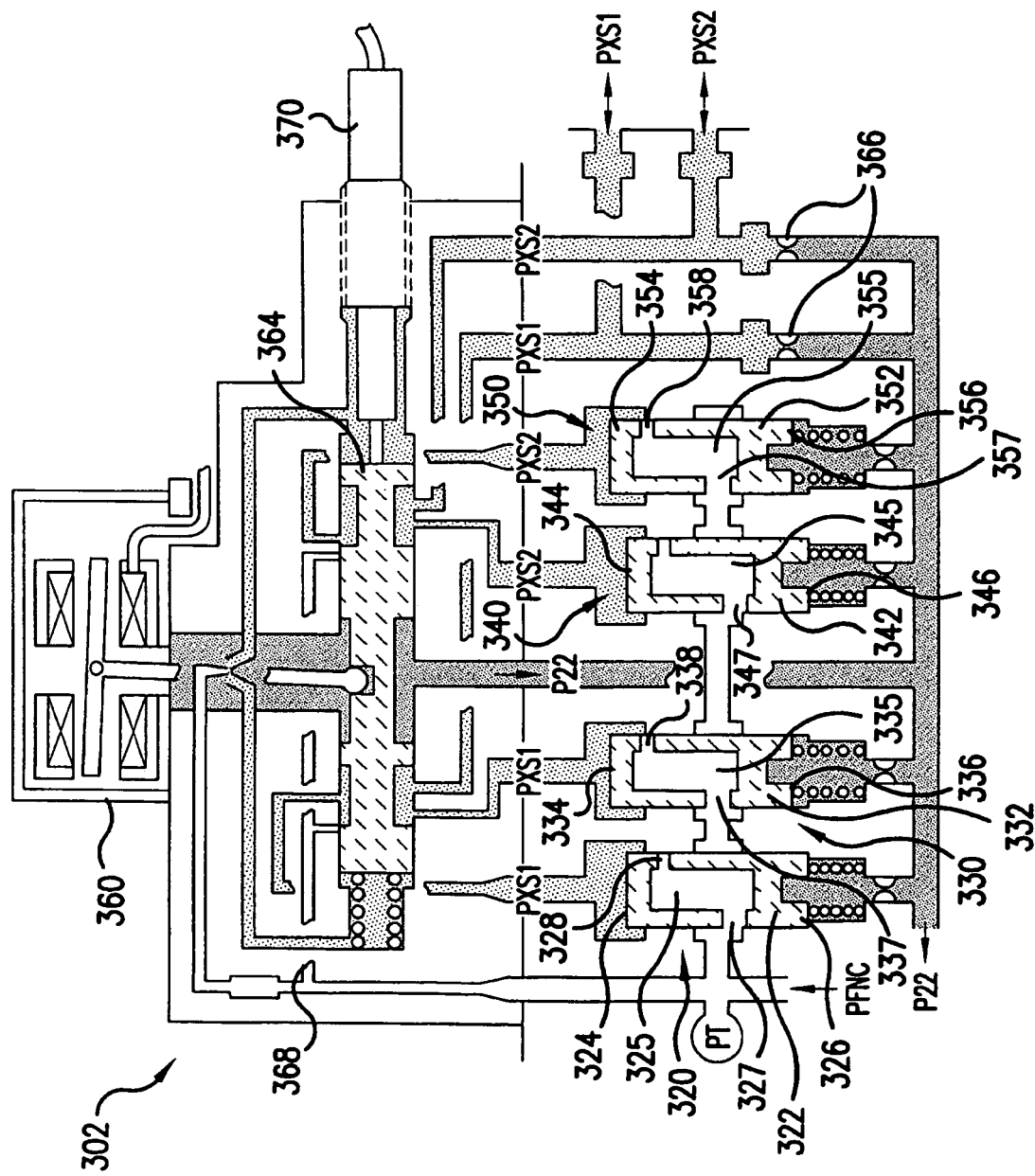
FIG. 20 is a detail view of the regulating portion of FIG. 15 showing the spool in a fifth position.

FIG. 20 illustrates spool 364 moved to a fifth position opening a flow path through fourth regulator 350 from PFNC to PXS2. Fourth regulator 350 regulates at a pressure of 159 psid and provides this pressure to PXS2. This pressure, being greater than the 95 psid at which third pressure regulator 340 regulates, is applied against first side 344 of third pressure regulator 340 and forces third regulator 340 against its biasing spring to its hard stop, closing the third regulator 340.

Figure 21:
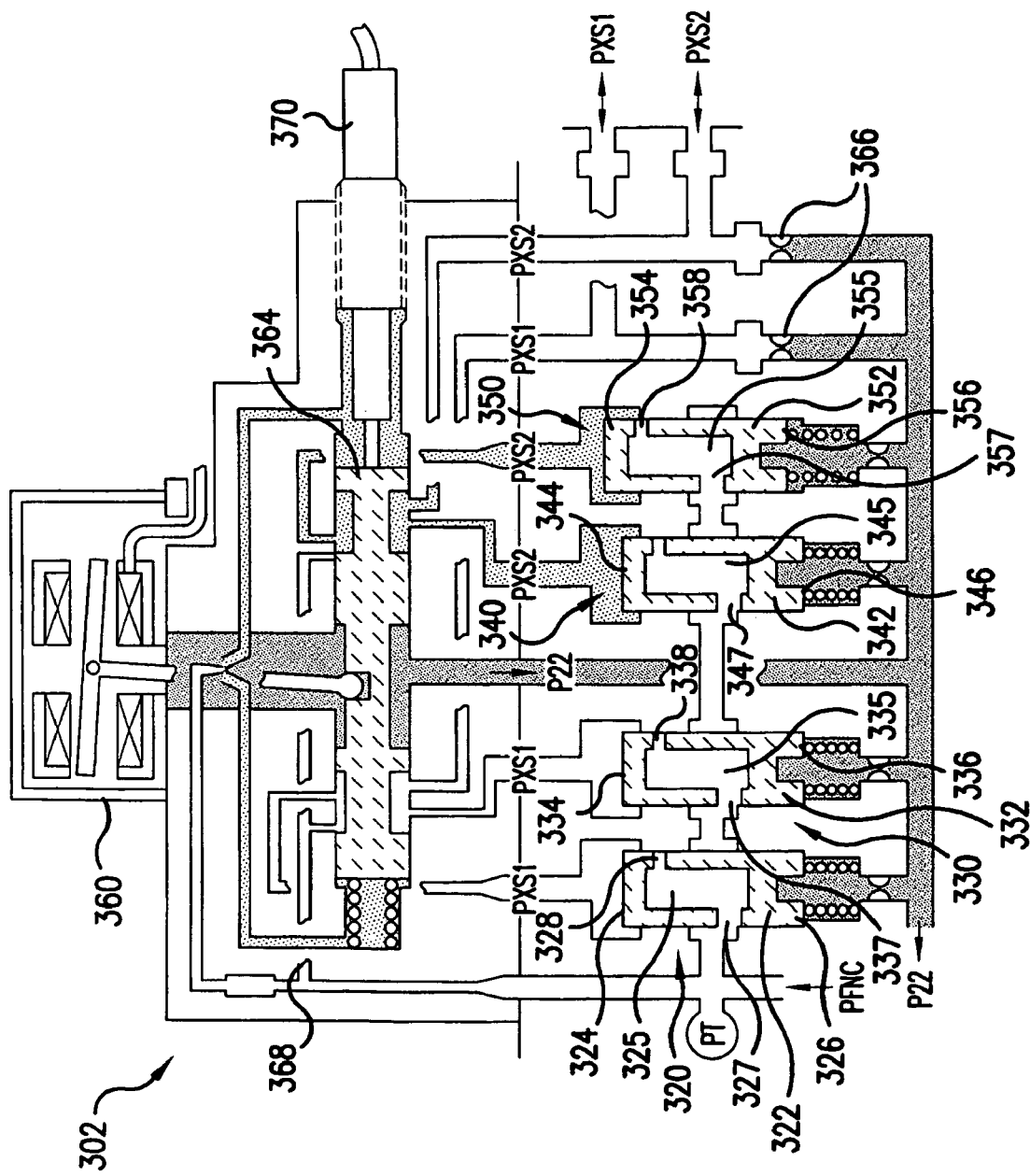
FIG. 21 is a detail view of the regulating portion of FIG. 15 showing the spool in a sixth position.

FIG. 21 illustrates spool 364 moved to a sixth position which opens an auxiliary flow path 368 between pressure PFNC and PXS1. The flow area is significantly larger than bleed 166, setting PXS1 nearly equal to PFNC, or approximately 250 psid. This pressure is greater than the 159 psid at which second regulator 330 regulates. This greater pressure is applied against first side 334 of second regulator 330, which forces second regulator 330 against its biasing spring to its hard stop position, shutting off the regulator.

Figure 22:
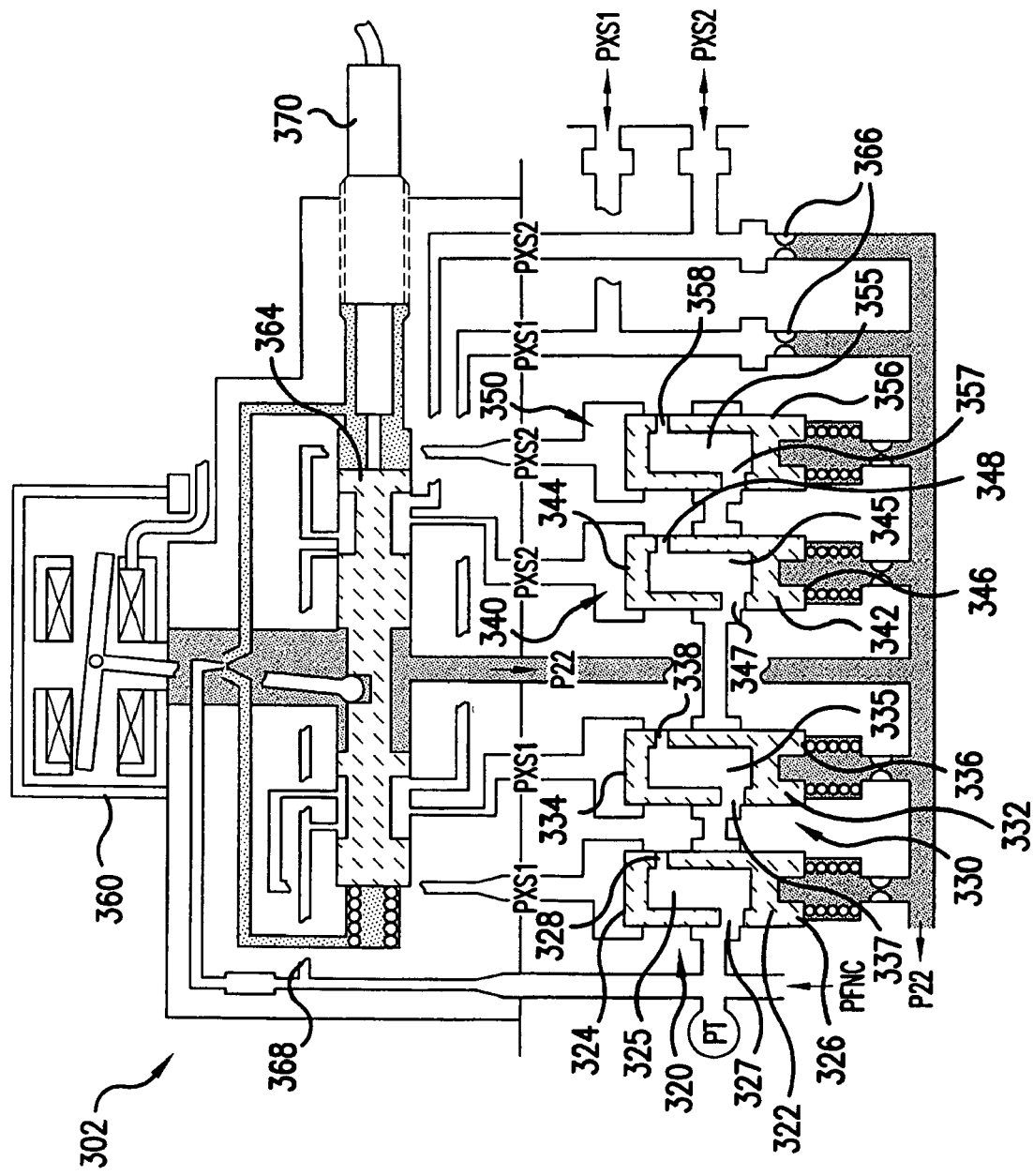
FIG. 22 is a detail view of the regulating portion of FIG. 15 showing the spool in a seventh position.
Figure 23:
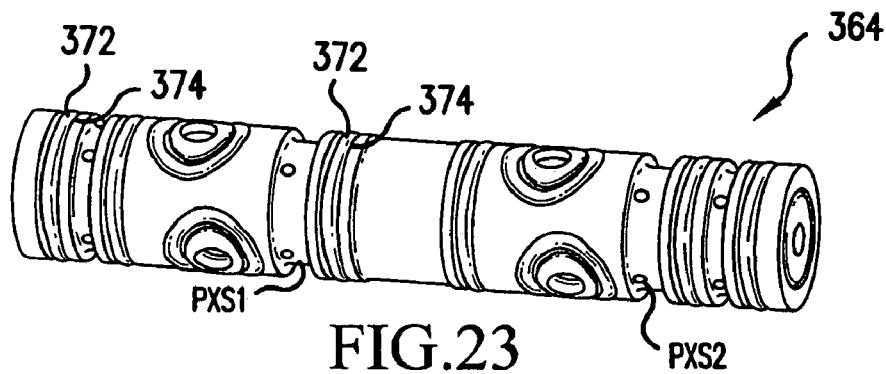
FIG. 23 is a first perspective view of the EHSV spool of FIG. 15.
Figure 24:
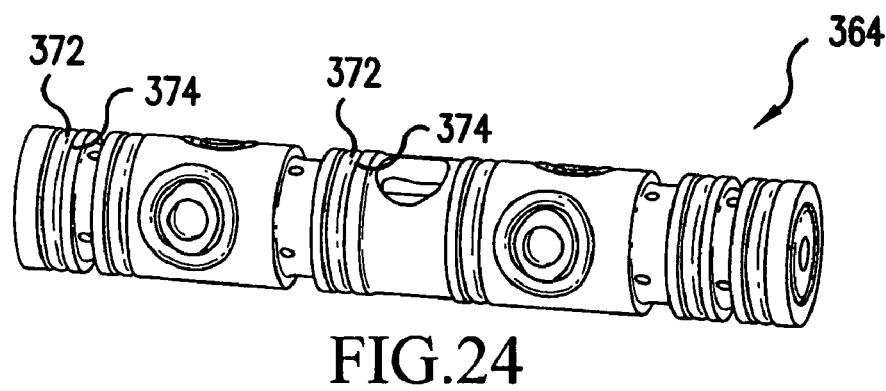
FIG. 24 is a second perspective view of the EHSV spool of FIG. 15.
Figure 25:
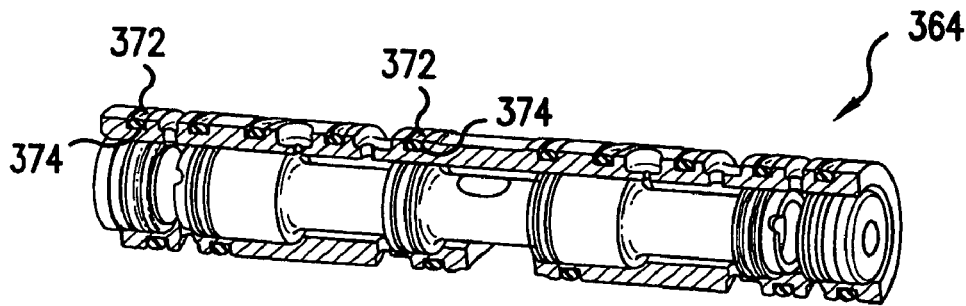
FIG. 25 is a sectional perspective view of the EHSV spool of FIG. 15.
Figure 26:
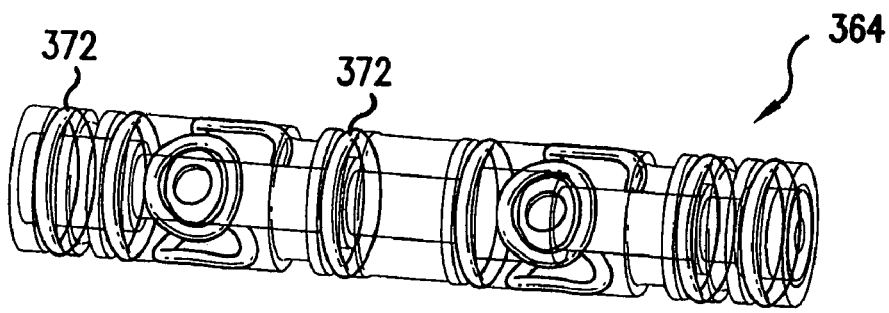
FIG. 26 is a third perspective view of the EHSV spool of FIG. 15.

FIG. 22 illustrates spool 364 moved to a seventh position which opens auxiliary flow path 368 between pressure PFNC and PXS2. The flow area is significantly larger than bleed 166, setting PXS2 nearly equal to PFNC, or approximately 250 psid. This pressure is greater than the 159 psid at which fourth regulator 350 regulates. This greater pressure is applied against first side 354 of fourth regulator 350, which forces fourth regulator 350 against its biasing spring to its hard stop, shutting off the regulator.

Closed loop feedback control is provided by LVDT 370 which is connected to and indicates the position of spool 364. Bleeds 366 from PXS1 and PXS2 to P22 are sized to provide sufficient flow for stable regulation in all operating cases. As depicted in FIG. 16, A load spring 365 places a force that biases spool 364 to the right most position during engine start up, shut down, or a failed EHSV hydraulic supply or electrical signal, resulting in the desired mode of operation for these conditions.

The porting configuration of the second stage spool 364 is illustrated in FIGS. 23-26. The use of o-ring seals 372 installed in radial-face-seal-type grooves 374 on the outer diameter of the spool 364 allows three separate regulator flow path channels to be axially located in close proximity, and one set of spool edges to control the porting of these three channels, thus minimizing the sleeve length and the amount of spool stroke required in the EHSV second stage. Six circumferential face seals are employed, three each for pressure signals PXS1 and PXS2.

Figure 27:
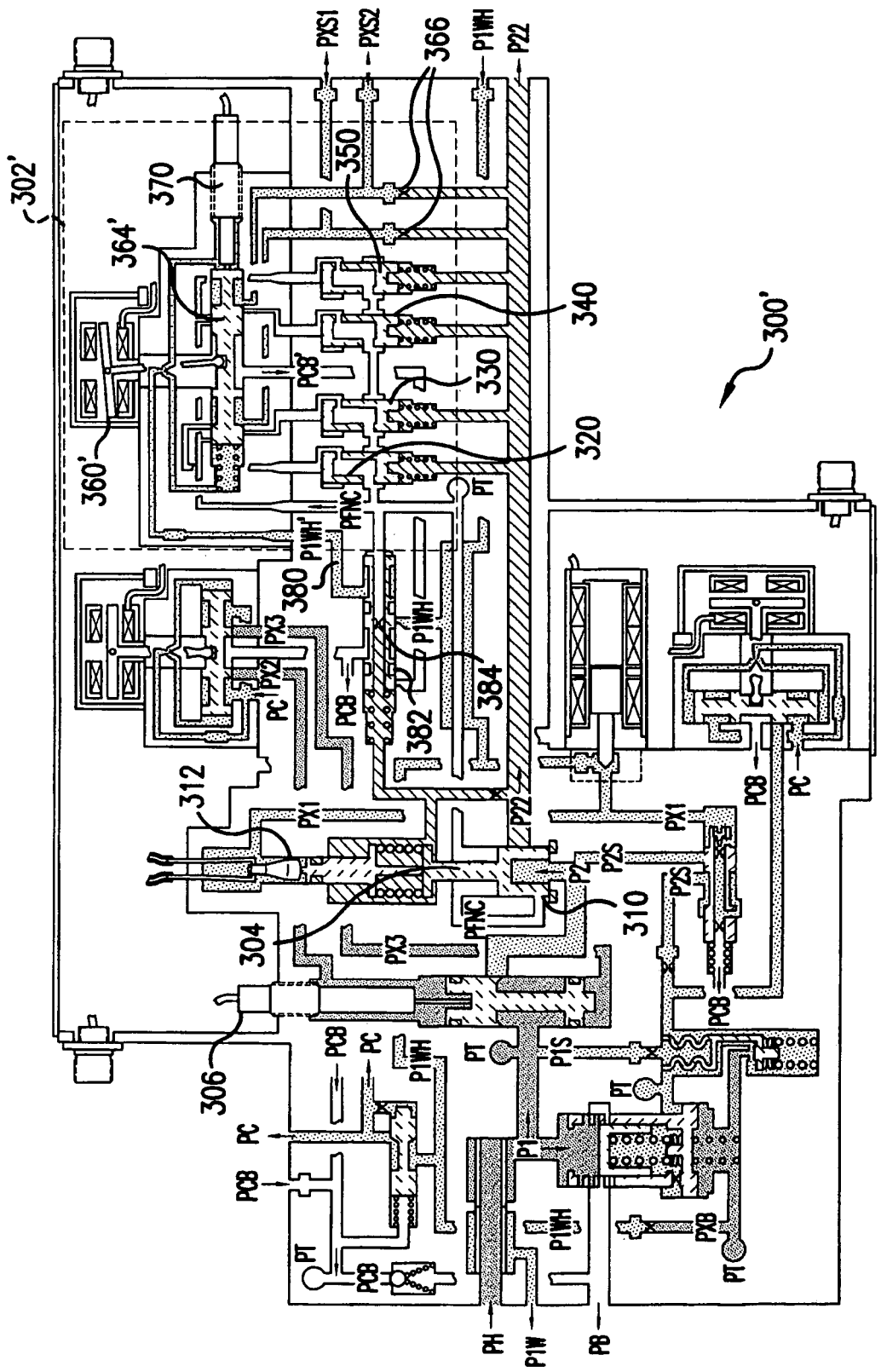
FIG. 27 is schematic view of a fuel control system according to a fourth embodiment of the present invention that includes a pressure control regulating portion having a spool.

A fourth embodiment of the present invention is illustrated in FIG. 27. Identical reference numerals are used to identify elements common to the third embodiment. Reference numerals with a prime are used to identify elements of the fourth embodiment that correspond to but are not identical to, elements of the third embodiment. This embodiment is substantially identical to the nozzle control system of the third embodiment.

The nozzle control EHSV of the fourth embodiment differs from the EHSV of the third embodiment in the supply and return pressures for the first stage. Rather than using PFNC, the first stage is supplied in this case by washed and heated fuel P1WH, via line 380, which is otherwise available in the fuel control. For the first stage return pressure, P22 is replaced by Pcb, also otherwise available in the fuel control. Pcb is a consistent, low pressure return and is desirable for use as a means to limit pressure loading of the first stage. The second stage, comprising spool 364', functions as described previously. The addition of the P1WH supply makes the EHSV a nine-way device rather than an eight-way.

The incorporation of the P1WH supply and Pcb return to the FNC EHSV create potential leak paths to P22, which must be capable of being shutoff. This is accomplished by the addition of the FNC servo shutoff valve 382. This valve 382 operates on the PFNC to P22 pressure differential. In shutoff, the pressurizing valve 304 is closed, PFNC is equal to P22, and spring load pushes the FNC servo shutoff valve 382 to the shutoff position stop (to the right as viewed in FIG. 27) where P1WH and Pcb supplies to the nozzle control system 302 are blocked off by dynamic cap seals on the valve 382.

In the flowing condition, the PFNC to P22 differential, set by the pressurizing valve 304, shuttles the FNC servo shutoff valve 382 against the spring load to the open position stop (to the left as viewed in FIG. 27), where P1WH and Pcb supplies are open to the nozzle control system 302. The orifice 384 in the center of the valve 382 allows PFNC to quickly bleed down to P22 when shutoff is commanded and the pressurizing valve 304 closes.

Figure 28:
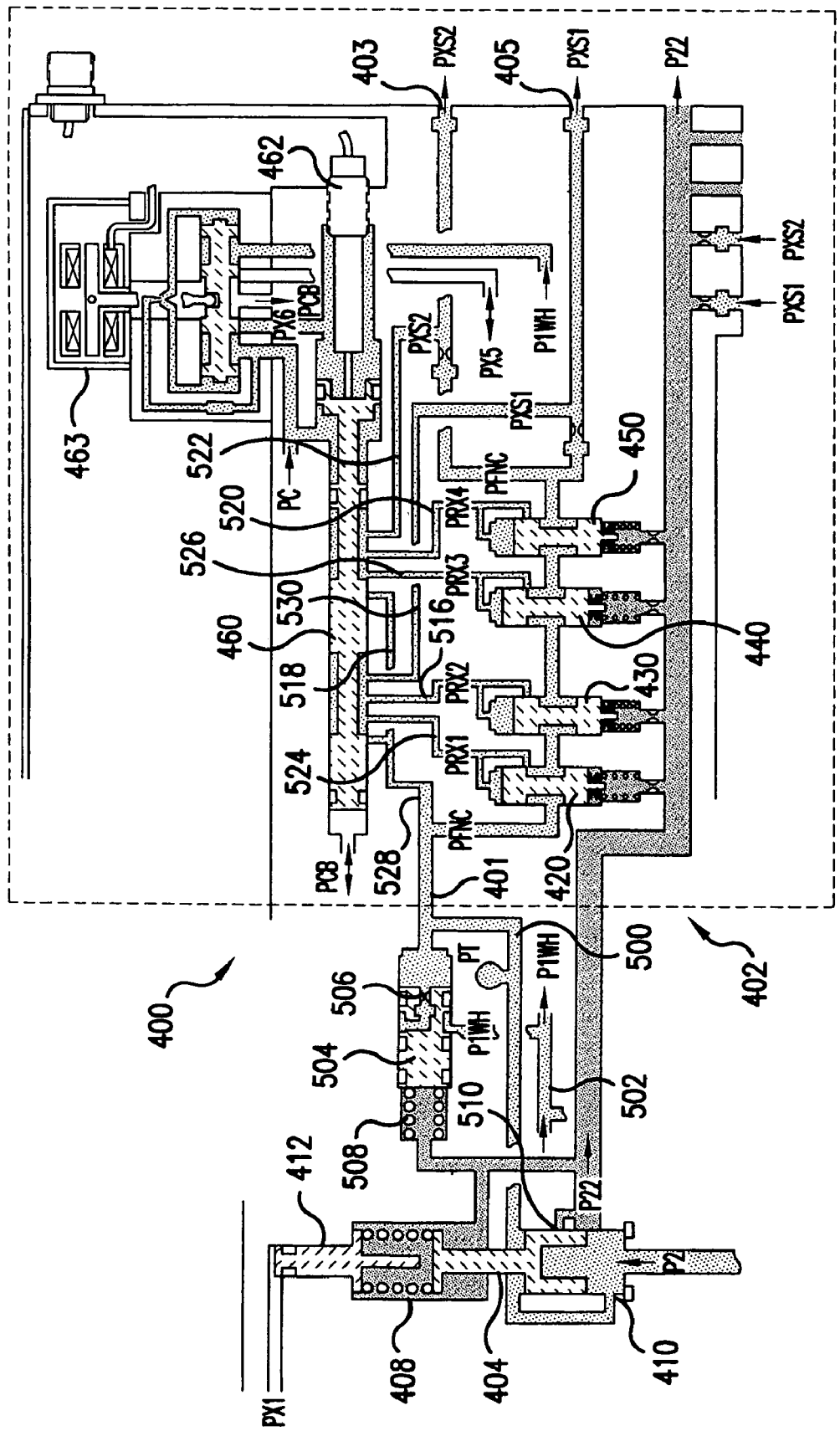
FIG. 28 is schematic view of a fuel control system according to a fifth embodiment of the present invention that includes a pressure control regulating portion having a spool.

FIG. 28 is a schematic diagram of a fuel control system 400 according to a fifth embodiment of the present invention which includes a fuel nozzle pressure control section 402 having an inlet 401 and first and second outlets 403, 405 at which pressures PXS1 and PXS2 are produced. Section 402 provides a mechanism to establish and control two separate signal pressures PXS1 and PXS2. First signal pressure PXS1 is set at any one of four discrete levels relative to fuel manifold pressure P22, ranging from zero to about 250 psid and specifically in the present example, discrete levels of 10, 95, 159 and 250 psid. Second signal pressure PXS2 is dependent on first signal pressure PXS1 and may take on values equal to or one step lower than first signal pressure PXS1. In other words, the following output pressure combinations (PXS1, PXS2) are produced by the disclosed embodiment of the present invention: (10, 10), (95, 10), (95, 95), (159, 95), (159, 159), (max, 159) and (max, max) (where "max" is approximately 250 psid). These signal pressure combinations are useful, for example, in controlling elements that normally operate at the same pressure level but which preferably shift from one pressure level to another one at a time to limit the dynamic impact to the system.

A pressurizing valve 404 supplies a muscle pressure PFNC to the nozzle control system 402 which is a minimum of 250 psid above fuel manifold pressure P22 at all flowing conditions. The pressurizing valve 404 operates on a pressure difference between the discharge pressure P2 of a metering valve (not shown) and P22, acting on the rod diameter of pressurizing valve 404 and working against a load spring 408. The valve rod diameter, valve porting and load spring 408 are selected such that P2 is not opened or "cracked" to pressure P22 until the difference between P2 and P22 exceeds 250 psid. At this cracking condition and at subsequent higher pressure differences, P2 is opened to PFNC via port(s) 410 in pressurizing valve 404. Thus at all flowing conditions, i.e. P2 opened to P22, PFNC is open and essentially equal to P2, establishing the necessary 250 psid differential pressure between PFNC and P22.

Valve 404 is closed by porting a high pressure signal PX1 to the back side of a shutoff piston 412. When this is done, the force exerted by the PX1-to-P22 pressure differential acting on the shutoff piston 412 area exceeds the spring load and the force of P2-to-P22 pressure differential on the pressurizing valve rod diameter. This forces the valve 404 closed against the sealing shutoff seat. In this position, fuel flow is positively shutoff to both PFNC and P22.

The PFNC ports 410 are smaller than the port for P22 flow and thus perform a filtering effect that helps protect downstream nozzle control components from contamination. Specifically, when pressurizing valve 404 is open, the main flow path to P22 carries a greater volume of fuel than the volume flowing to PFNC. This greater volume of fuel surges past the PFNC ports, carrying much, if not all, contamination in the fuel to the P22 flow path, away from the control elements that are contacted by the PFNC flow.

Pressure control system 402 comprises four pressure regulators, namely a first pressure regulator 420, a second pressure regulator 430, a third pressure regulator 440 and a fourth pressure regulator 450 as well as a seven-position sequencing valve 460 that controls activation of the pressure regulators 420, 430, 440, 450. The position of sequencing valve 460 is monitored by LVDT 462 and controlled by pressure PX6 from EHSV 463

With reference to FIGS. 29-35, first pressure regulator 420 includes a piston 422 having a first or control side 424, a middle metering area 425, a second side 426 a supply port 427, a metering port 428 and a biasing spring 429; second regulator 430 includes a piston 432 having a first or control side 434, a middle metering area 435, a second side 436 a supply port 437, a metering port 438, and a biasing spring 439; third regulator 440 includes a piston 442 having a first or control side 444, a middle metering area 445, a second side 446, a supply port 447, a metering port 448, and a biasing spring 449; and fourth regulator 450 includes a piston 452 having a first or control side 454, a middle metering area 455, a second side 456, a supply port 457, a metering port 458 and a biasing spring 459. Bimetallic elements 501, which may comprise, for example, pairs of conical bimetallic disks that expand when heated, are provided between each spring 429, 439, 449, 459 and its associated piston 422, 432, 442, 452. The shear modulus of the spring material decreases when heated which reduces the spring load at a given length and affects the setpoint of each pressure regulator. The bimetallic elements 501 expand when heated, compress the springs as temperature rises, and thus counteract the reduction in load of the springs. This helps to maintain a more constant pressure setpoint. While the pistons, middle metering areas, piston sides and supply and metering ports are visible in FIG. 28, for clarity, they are only labeled in the detail views of FIGS. 29-35.

Pressure control system 402 is provided with fuel from pressurizing valve 404 via conduit 500 which fuel flow is supplemented by washed heated fuel P1WH from conduit 502. Conduit 502 provides the washed heated fuel to a positive wash flow shutoff valve 504 and through a fixed bleed 506 to the PFNC flow and to pressure control system 402. P1WH is maintained at a fixed level above pressure P2 by a separate function of the fuel control system. This supplemental flow helps protect the pressure control system 402 and elements downstream therefrom from icing and contamination. Bleed 506 is sized to provide a majority of the required fuel flow to maintain pressure PFNC—substantially all the required fuel flow under low fuel flow conditions. Under high demand conditions, fuel from pressurizing valve 404 is also provided to pressure control system 402. When pressurizing valve 404 is closed, stopping fuel flow PFNC, spring 508 closes positive wash shutoff valve 504 to seal the path to the supplemental wash flow bleed 506. PFNC decays to P22 via system bleed-down and an opened port 510 in the pressurizing valve sleeve.

Figure 29:
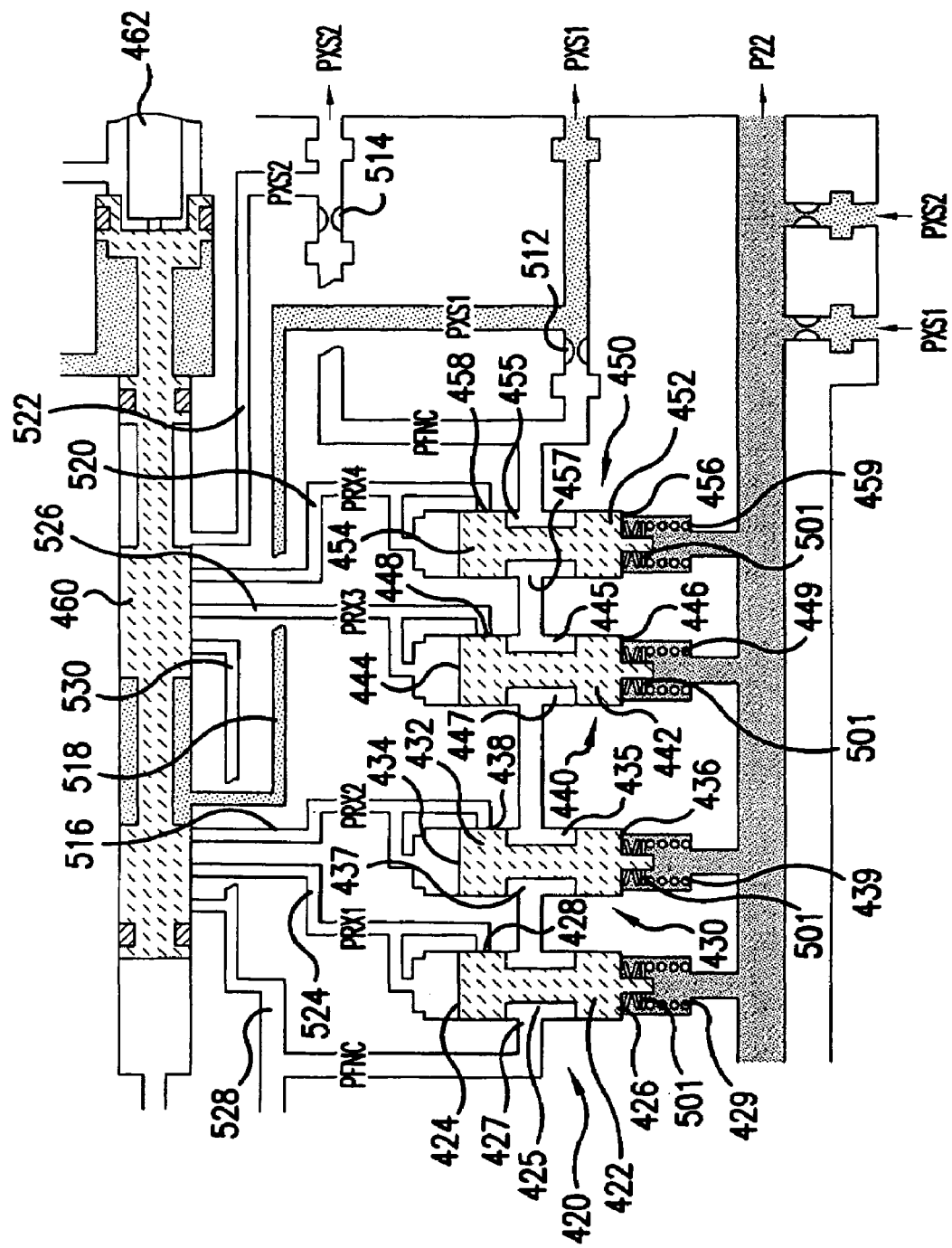
FIG. 29 is a detail view of the regulating portion of FIG. 28 showing the spool in a first position.

FIG. 29 illustrates the pressure control system 402 in a first, deadhead, state. In this configuration, leakage from PFNC to the control side of the regulators significantly exceeds leakage from the control side to PXS in the sequencing valve, setting the control side pressure essentially equal to PFNC. The PFNC-P22 pressure differential moves the regulators 420, 430, 440, 450 against their springs to a retract hard stop position. With all regulators in this position, the only flow path from PFNC to PXS1 and PXS2 is through first circulation bleed 512, and second circulation bleed 514. These first and second fixed bleeds 512, 514 are sized so that PXS1-P22 and PXS2-P22 are nominally 10 psid in this first configuration.

Figure 30:
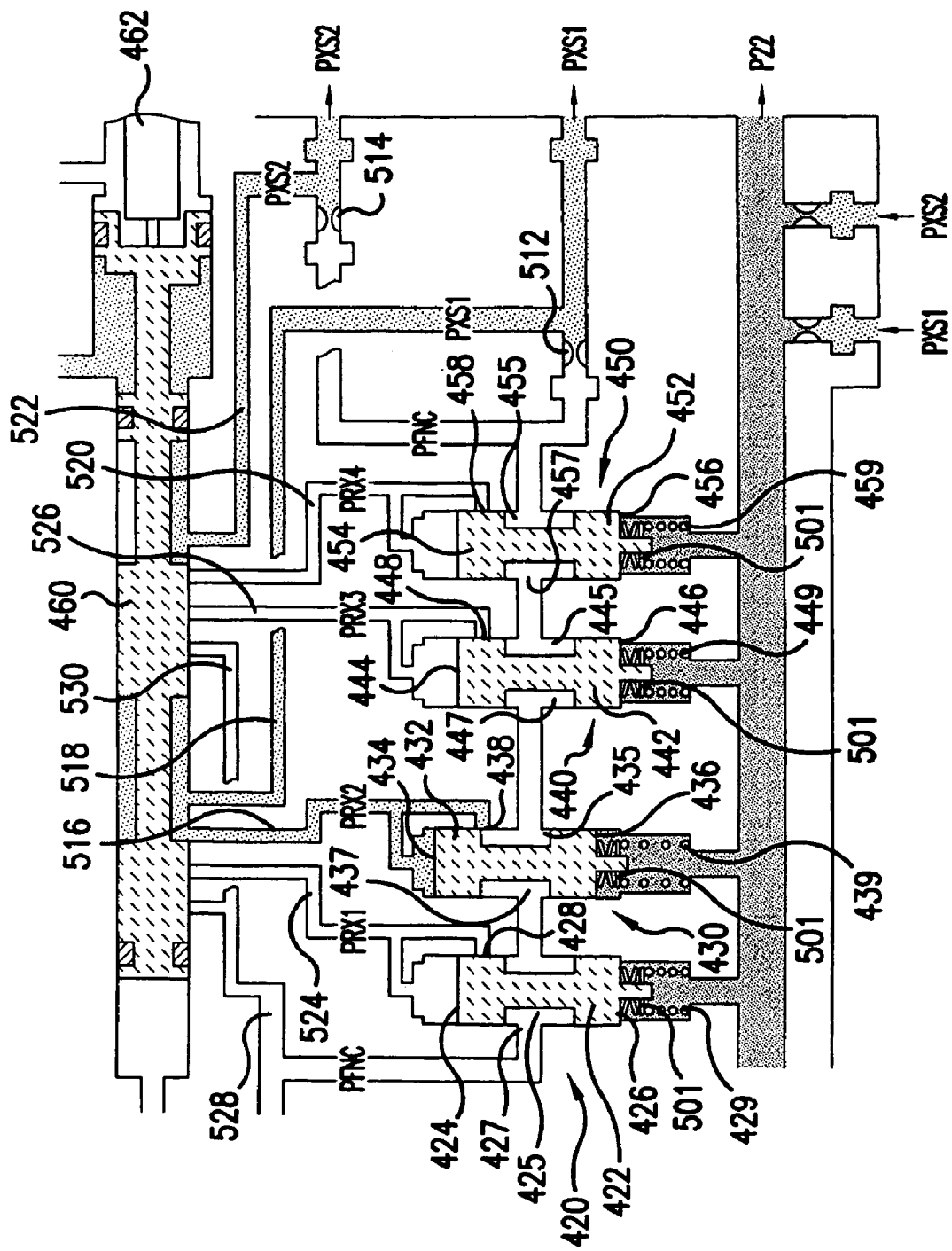
FIG. 30 is a detail view of the regulating portion of FIG. 28 showing the spool in a second position.

FIG. 30 illustrates sequencing valve 460 moved to a second position, away from LVDT 462, to the left of the position illustrated in FIG. 29. In this position, sequencing valve 460 opens a flow path 516 from second pressure regulator 430 to the sequencing valve 460 so that fuel can reach flow path 518 from the sequencing valve 460 to PXS1. Second pressure regulator 430 is set to regulate at 95 psi above P22, and second flow path 518 connects to PXS1 downstream of first circulation bleed 512 thereby providing a pressure at PXS1 of 95 psid relative to P22. PXS2 remains at 10 psid due to the continued flow of PFNC through fixed bleed 514.

Figure 31:
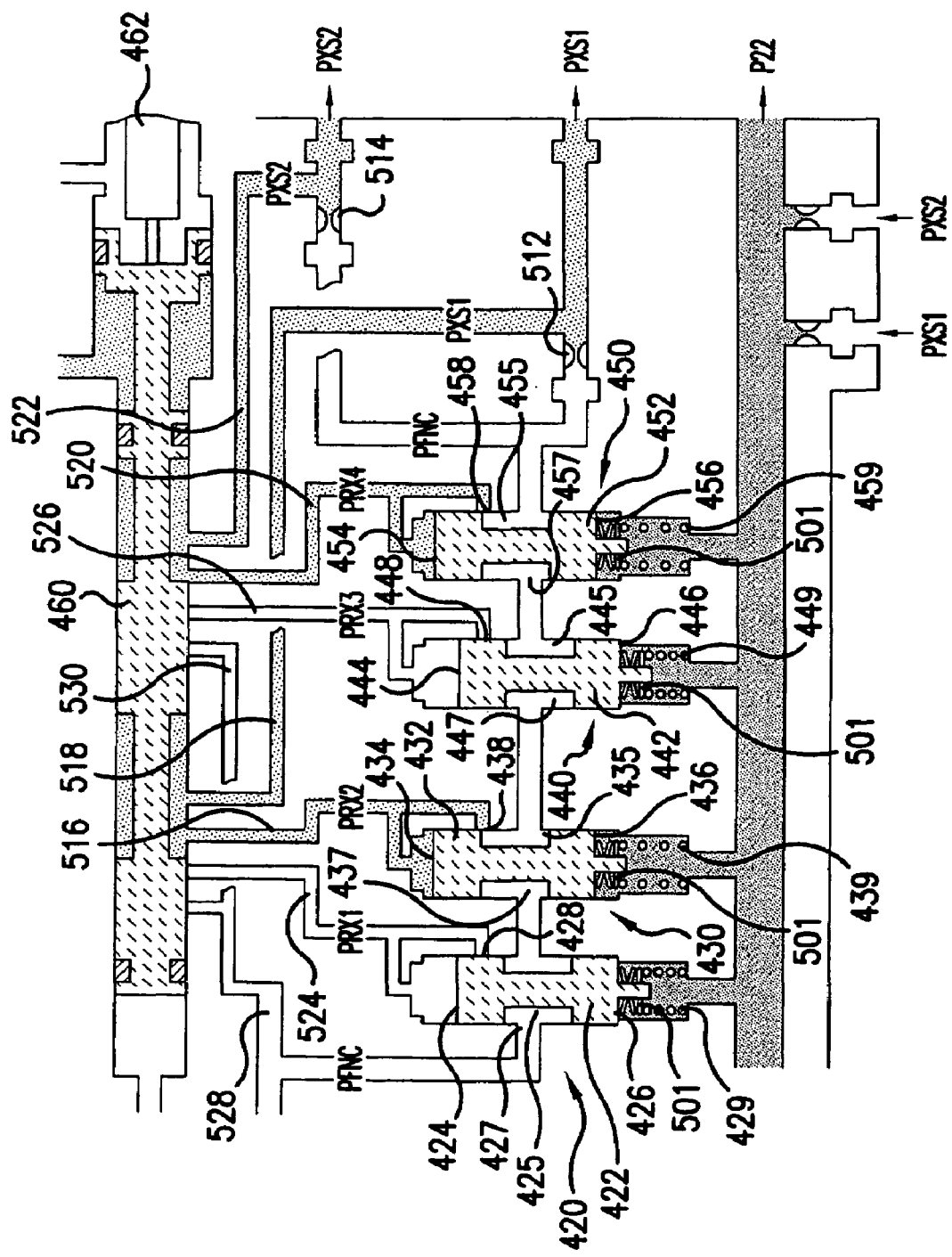
FIG. 31 is a detail view of the regulating portion of FIG. 28 showing the spool in a third position.

FIG. 31 illustrates sequencing valve 460 moved to a third position, to the left of the position illustrated in FIG. 30. In this position, sequencing valve 460 opens a flow path 520 from fourth pressure regulator 450 to sequencing valve 460 which connects to PXS2 via a flow path 522. Fourth pressure regulator 450 regulates at 95 psid and thus provides a pressure signal PXS2 of 95 psid relative to P22.

Figure 32:
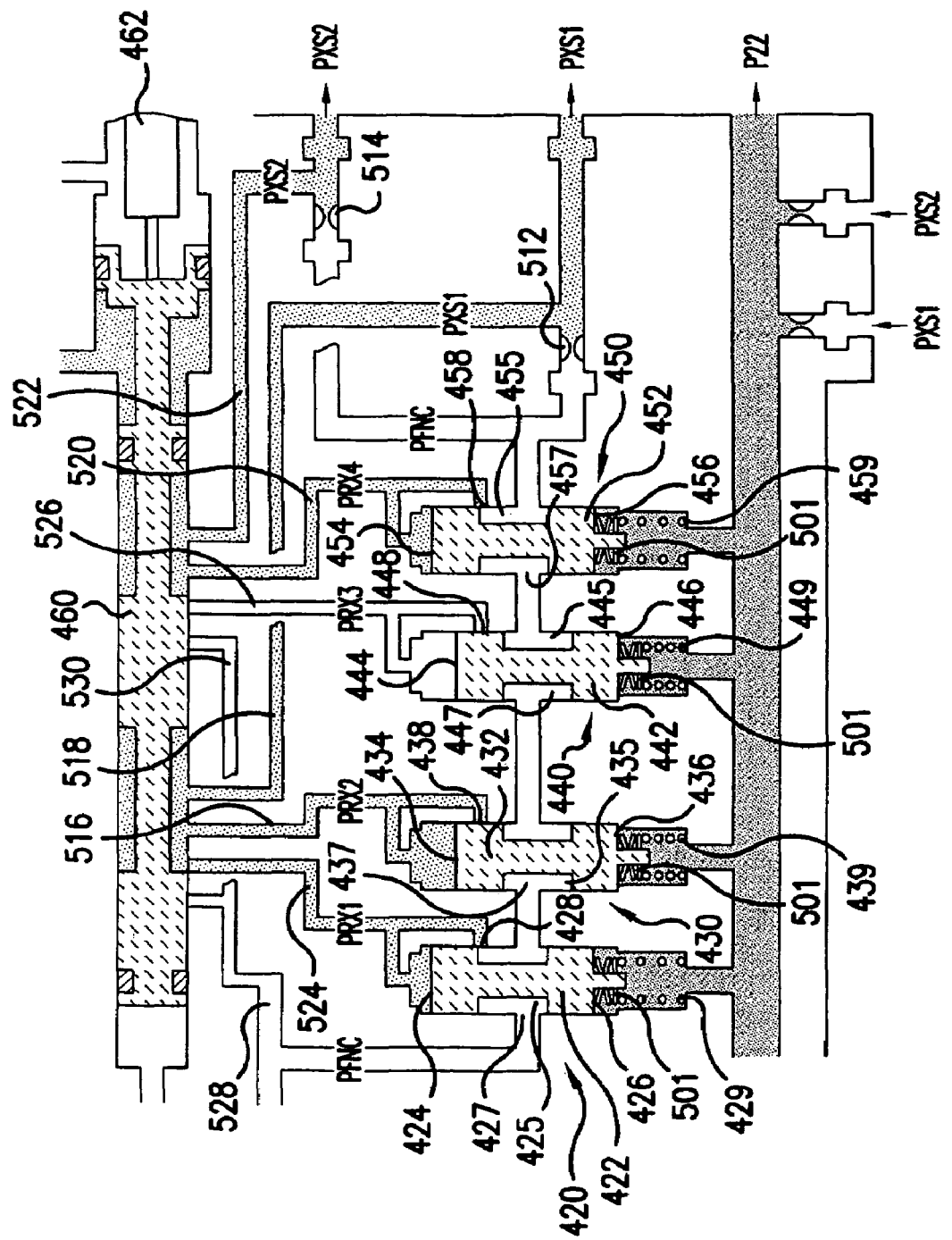
FIG. 32 is a detail view of the regulating portion of FIG. 28 showing the spool in a fourth position.

FIG. 32 illustrates sequencing valve 460 moved to a fourth position, left of the position illustrated in FIG. 31. In this position, the sequencing valve 460 opens a flow path 524 between first pressure regulator 420 and sequencing valve 460. First pressure regulator 420 is set to regulate at a pressure of 159 psid. This pressure closes second pressure regulator 430 and supplies a pressure PXS1 of 159 psid relative to P22 via flow path 518.

Figure 33:
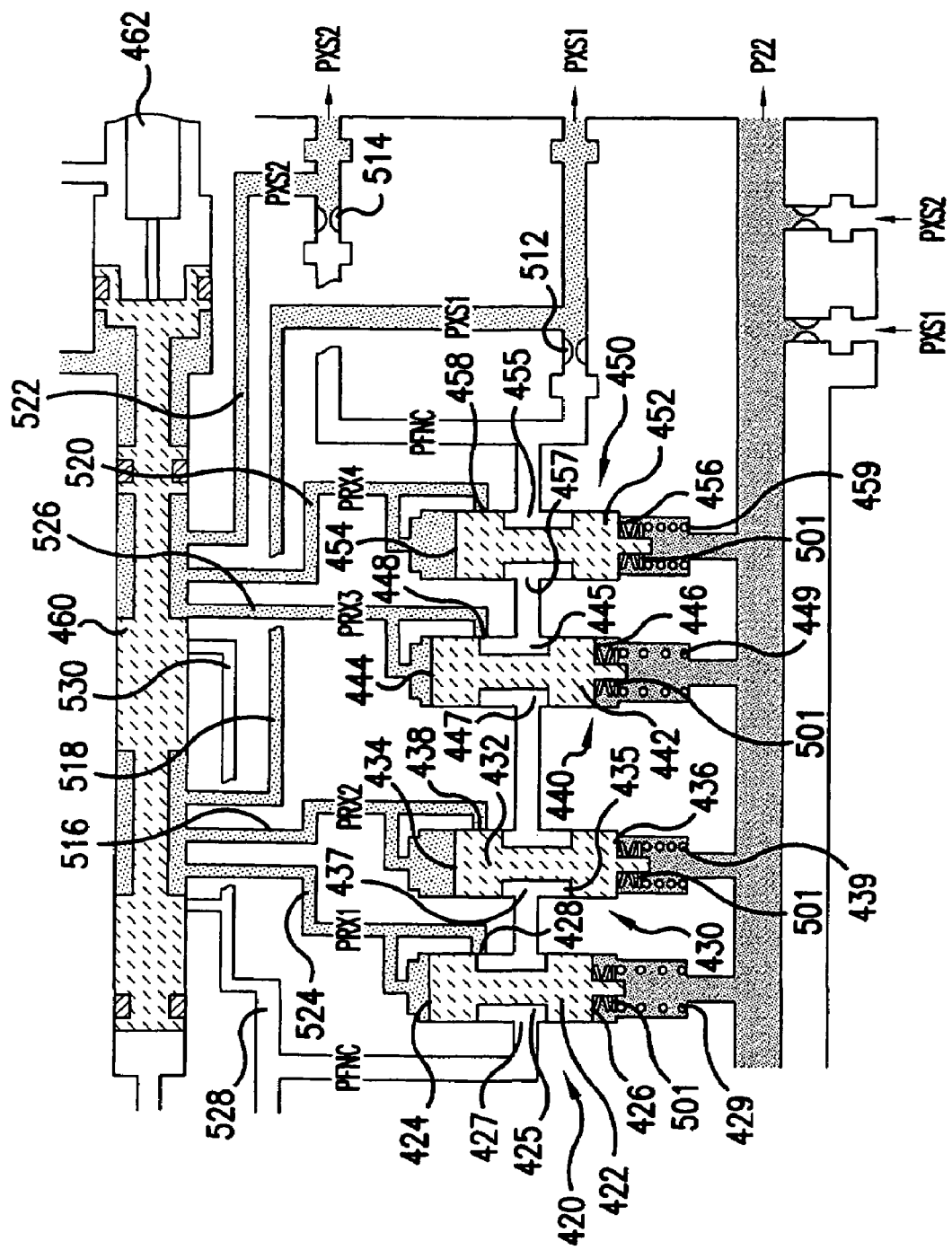
FIG. 33 is a detail view of the regulating portion of FIG. 28 showing the spool in a fifth position.

FIG. 33 illustrates sequencing valve 460 moved to a fifth position, left of the position illustrated in FIG. 32. In this position, the sequencing valve 460 opens a flow path 526 between third pressure regulator 440 and sequencing valve 460. Third pressure regulator 440 is set to regulate at a pressure of 159 psid. This pressure closes fourth pressure regulator 450 and supplies a pressure PXS2 of 159 psid relative to P22 via flow path 522.

Figure 34:
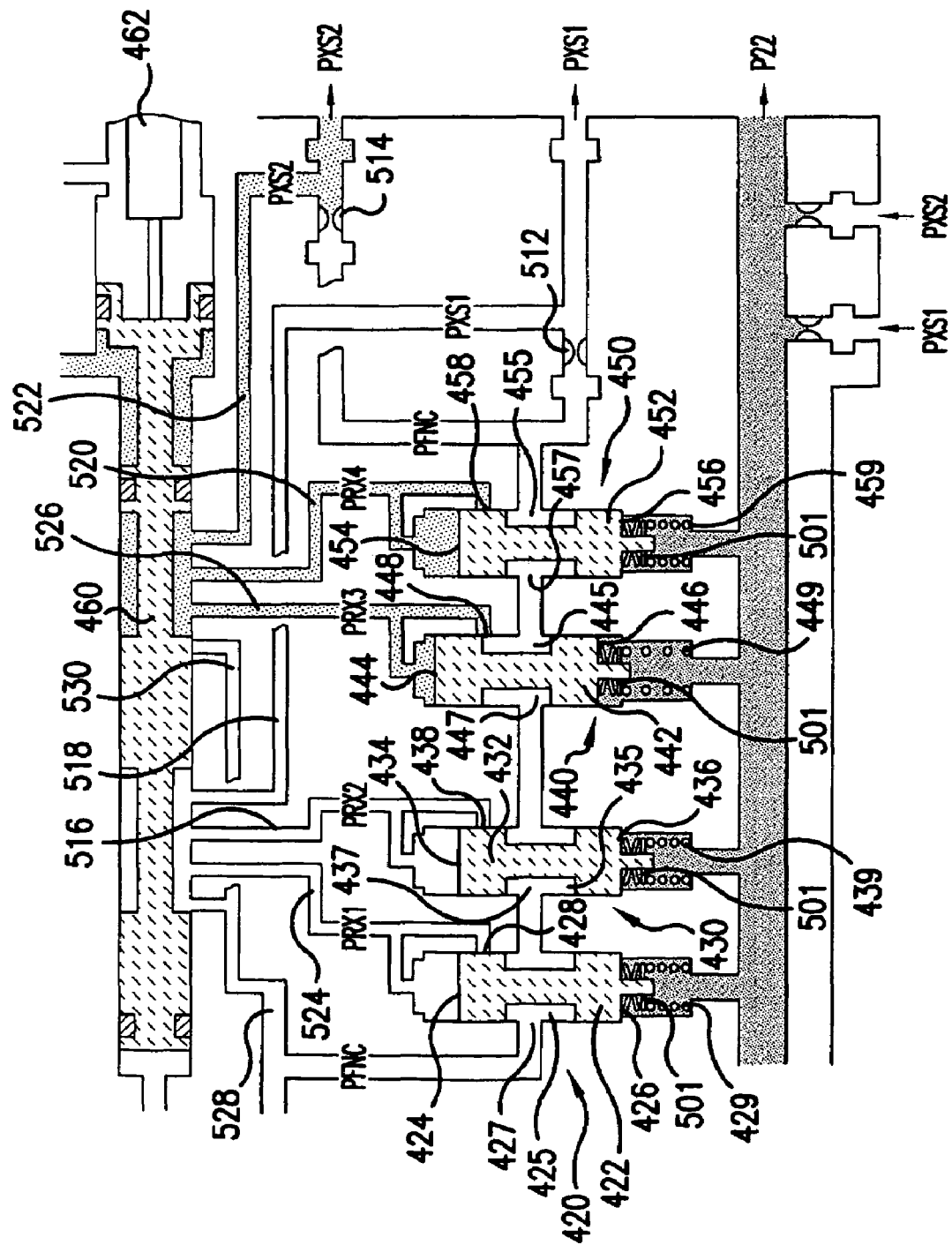
FIG. 34 is a detail view of the regulating portion of FIG. 28 showing the spool in a sixth position.

FIG. 34 illustrates sequencing valve 460 moved to a sixth position, left of the position illustrated in FIG. 33. In this position, sequencing valve 460 opens a direct flow path 528 from PFNC to the sequencing valve 460 and to PXS1 via flow path 518, providing a maximum pressure level approximately equal to PFNC at PXS1. This pressure closes first regulator 420 and second regulator 430.

Figure 35:
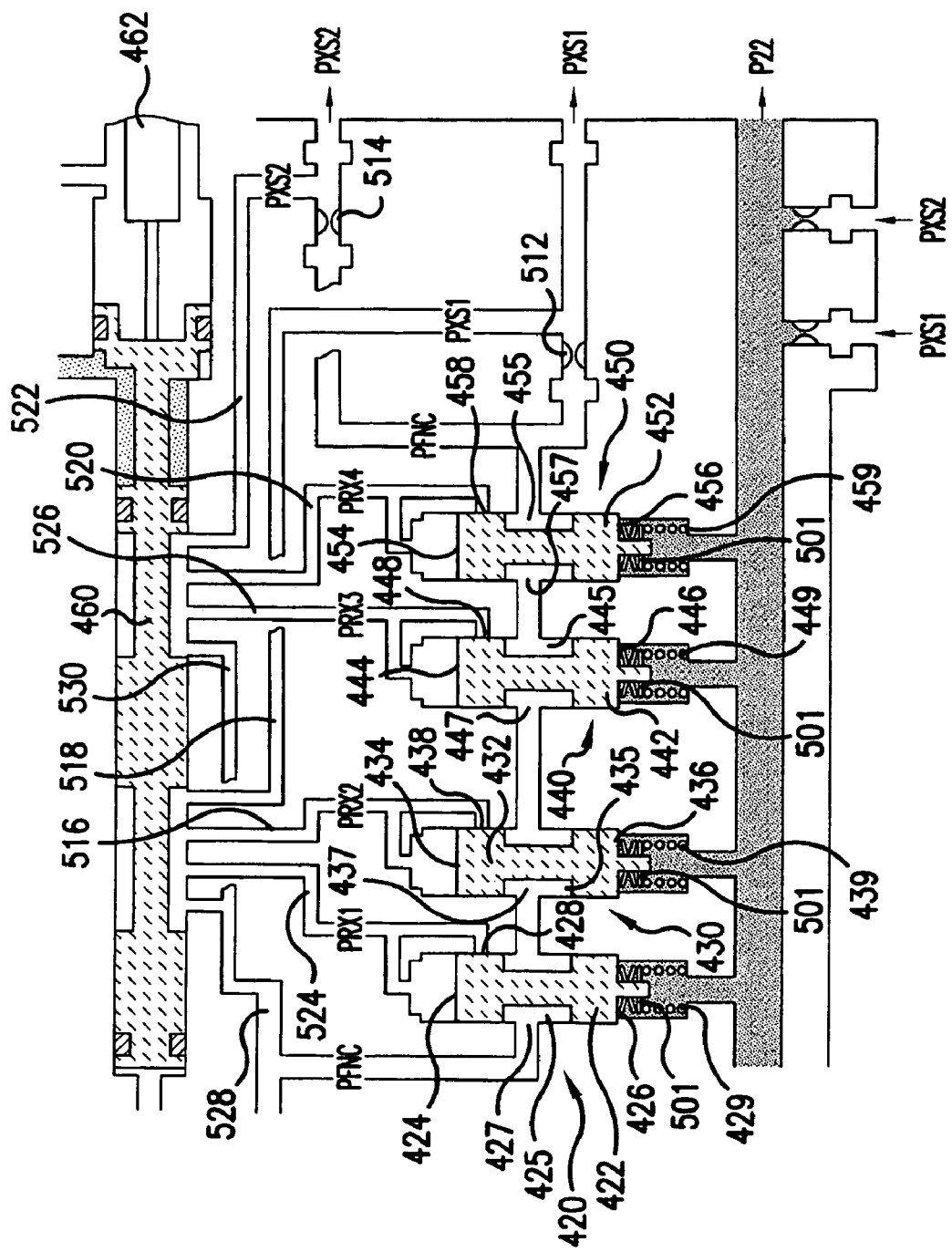
FIG. 35 is a detail view of the regulating portion of FIG. 28 showing the spool in a seventh position.

FIG. 35 illustrates sequencing valve 460 moved to a seventh position, left of the position illustrated in FIG. 34. In this position, sequencing valve 460 opens a direct flow path 530 from PFNC to the sequencing valve 460 and to PXS2 via flow path 522, providing a maximum pressure level approximately equal to PFNC at PXS2. This pressure closes third regulator 440 and fourth regulator 450.

Figure 36:
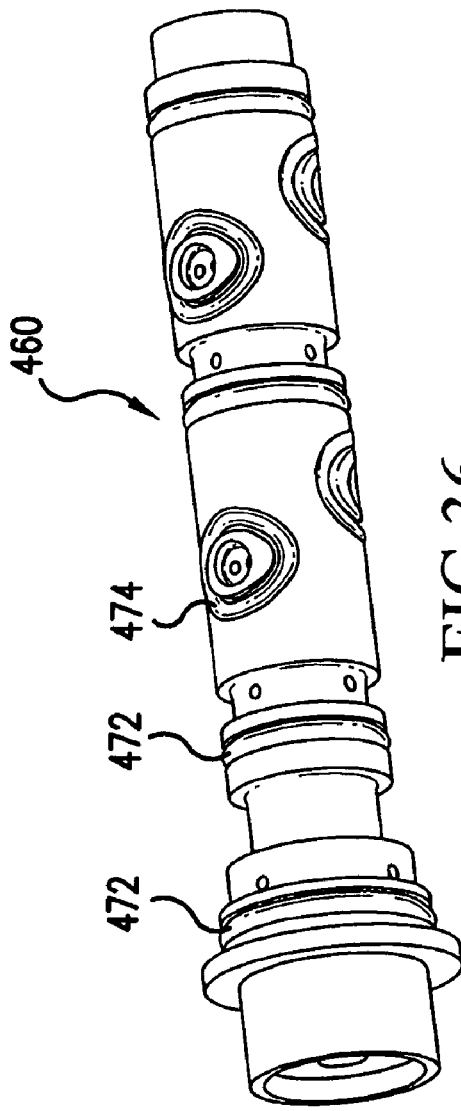
FIG. 36 is a first perspective view of the spool of FIG. 28.
Figure 37:
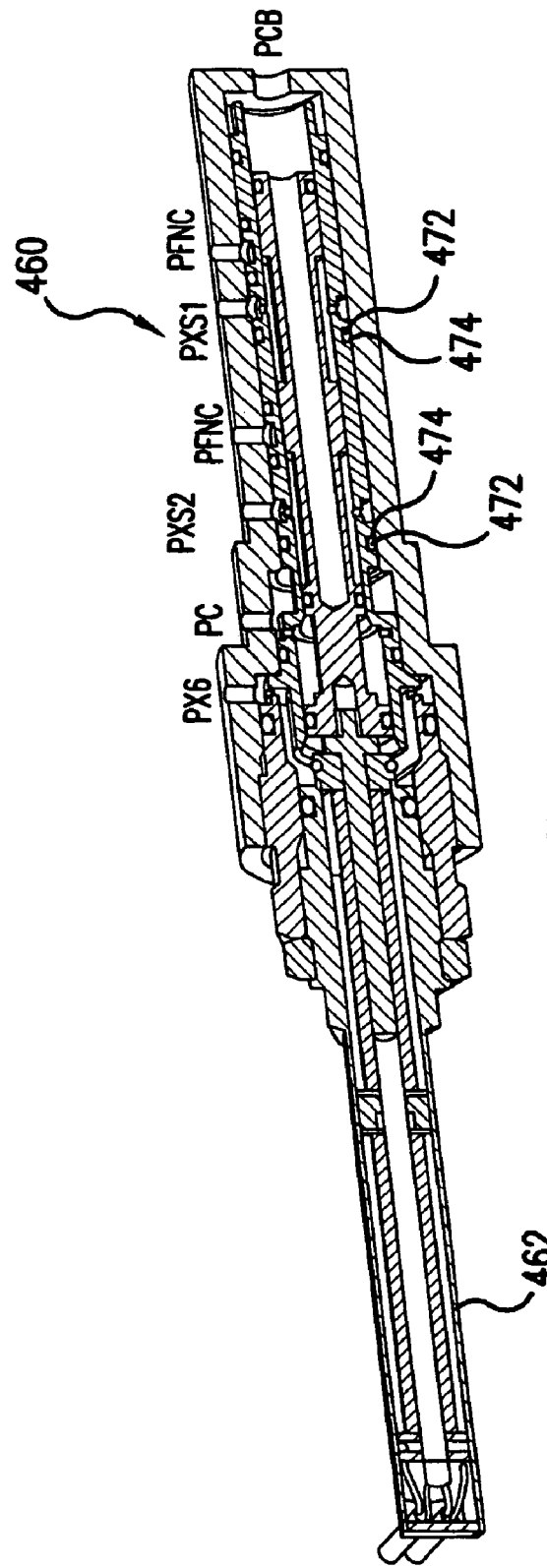
FIG. 37 is a sectional perspective view of a linear variable differential transducer and the spool of FIG. 28.

The porting configuration in the sequencing valve 460 is illustrated in FIGS. 36 and 37. The use of o-ring seals 472 installed in radial-face-seal-type grooves 474 on the outer diameter of the sequencing valve 460 allows three separate regulator flow path channels to be axially located in close proximity, and one set of sequencing valve edges to control the porting of these three channels, thus minimizing the sleeve length and the amount of stroke required to provide the seven combinations of pressure signals. Six circumferential face seals are employed, three each for the two PXS pressure signals.

It should be recognized that additional variations of the above-described implementations may be reached without departing from the spirit and scope of the present invention.

We claim:

1. A fuel system, comprising:
    a first fuel line carrying fuel at a first line pressure;
    a second fuel line carrying fuel at a second line pressure greater than said first line pressure;
    at least one pressure regulating section comprising an input connected to said second fuel line and at least one output, a first pressure regulator connected to said input and a second pressure regulator connected between said first pressure regulator and said at least one output, said first pressure regulator and said second pressure regulator each comprising a valve having a control surface and a metering orifice; and
    a spool of an electro-hydraulic servo valve regulating a fluid control pressure applied against the control surface of each of said first and second valves so as to control the position of said first and second pressure regulators to produce at said output one of a predetermined number of output pressures relative to said first line pressure.

2. The fuel system of claim 1 including a linear variable differential transducer connected to said spool.

3. The fuel system of claim 1 wherein said first and second pressure regulators each include a control side, and said controller controls a pressure applied against said control side.

4. The fuel system of claim 1 wherein said first pressure regulator regulates at a first valve pressure and said second pressure regulator regulates at a second valve pressure different than said first valve pressure.

5. The fuel system of claim 1 wherein said pressure regulating section further comprises a third pressure regulator connected between said second pressure regulator and said at least one output and a fourth pressure regulator connected between said third pressure regulator and said at least one output, said first pressure regulator regulating at a first valve pressure, said second pressure regulator regulating at a second valve pressure greater than said first valve pressure, said third pressure regulator regulating at a third valve pressure greater than said second valve pressure, and said fourth pressure regulator regulating at a fourth valve pressure greater than said third valve pressure.

6. The fuel system of claim 1 wherein said predetermined number of output pressures comprises four.

7. The fuel system of claim 5 including a first flow path from said second fuel line to said first pressure regulator control side, a second flow path from said second fuel line to said second pressure regulator control side, a third flow path from said second fuel line to said third pressure regulator control side and a fourth flow path from said second fuel line to said fourth pressure regulator control side.

8. The fuel system of claim 7 wherein said movable member is positionable to block zero or more of said first, second, third and fourth flow paths.

9. The fuel system of claim 7 wherein said movable member is shiftable among first, second, third, fourth and fifth positions, said movable member in said first position blocking none of said first, second, third and fourth flow paths;
    said movable member in said second position blocking said first flow path;
    said movable member in said third position blocking said first and second flow paths;
    said movable member in said fourth position blocking said first, second and third flow paths; and
    said movable member in said fifth position blocking said first, second, third and fourth flow paths.

10. The fuel system of claim 9 wherein said output pressure is related to the number of flow paths blocked by said movable member.

11. The fuel system of claim 5 wherein said at least one output comprises first and second outputs and including a first flow path from said first pressure regulator to said first output, a second flow path from said second pressure regulator to said second output; a third flow path from said third pressure regulator to said first output and a fourth flow path from said fourth pressure regulator to said second output.

12. The fuel system of claim 11 wherein said movable member is shiftable among first, second, third, fourth and fifth positions, said movable member in said first position blocking said first, second, third and fourth flow paths;

said movable member in said second position blocking said second, third and fourth flow paths;

said movable member in said third position blocking said third and fourth flow paths;

said movable member in said fourth position blocking said fourth flow path; and said movable member in said fifth position blocking none of said first, second, third and fourth flow paths.

13. The fuel system of claim 11 wherein said output pressure at said first and second outputs is related to the flow paths blocked by said movable member.

14. The fuel system of claim 12 including a fifth flow path from said second fuel line to said first output and a sixth flow path from second fuel line said second output.

15. The fuel system of claim 14 wherein said movable member blocks said fifth and sixth flow paths in said first, second, third, fourth and fifth positions, unblocks said fifth flow pats in a sixth position and unblocks said sixth flow path in a seventh position.

16. In a fuel system comprising a first fuel line carrying fuel at a first pressure and a second fuel line carrying fuel at a second pressure greater than said first pressure, a method of establishing at least one location a signal pressure at one of a plurality of discrete levels relative to said first pressure comprising the steps of:

providing a flow path between the second fuel line and the at least one location;

providing a first pressure regulator regulating at a first pressure and a second pressure regulator regulating at a second pressure in the flow path, each of said pressure regulators comprising a valve having a control side and a metering orifice; and providing an electro-hydraulic servovalve having a spool and adjusting the position of the spool to control a pressure applied against the control side of each pressure regulator to control the positions thereof and to establish first and second signal pressures at the at least one location.

17. In a fuel system comprising a first fuel line carrying fuel at a first pressure and a second fuel line carrying fuel at a second pressure greater than said first pressure, a method of establishing first and second locations of a signal pressure at one of a plurality of discrete levels relative to said first pressure comprising the steps of:

providing a flow path between the second fuel line and the at least one location;

providing a first pressure regulator regulating at a first pressure and a second pressure regulator regulating at a second pressure in the flow path; and controlling the positions of the first and second pressure regulators to establish a first or second signal pressure at each of the first and second locations.

18. In a fuel system comprising a first fuel line carrying fuel at a first line pressure and a second fuel line carrying fuel at a second line pressure greater than said first line pressure, a method of establishing at a first location a first signal pressure at one of a plurality of discrete levels relative to said first line pressure and at a second location a second signal pressure at one of the plurality of discrete levels relative to the first line pressure comprising the steps of:

providing a first flow path connecting the second fuel line and the first and second locations;

providing a first pressure regulator regulating at a first pressure and a second pressure regulator regulating at a second pressure in the flow path;

providing a third pressure regulator regulating at the first pressure and a fourth pressure regulator regulating at the second pressure in the flow path; and controlling the positions of the first, second, third and fourth pressure regulators to establish first and second signal pressures at the first and second locations.

19. In a fuel system comprising a first fuel line carrying fuel at a first line pressure and a second fuel line carrying fuel at a second line pressure greater than said first line pressure, a method of establishing at first and second outputs of a pressure regulating section first and second signal pressures each at one of a plurality of discrete levels relative to said first line pressure comprising the steps of:

providing a first set of n pressure regulating valves in the pressure regulating section in communication with the second fuel line, each pressure regulating valve of the first set regulating at a different pressure than the other pressure regulating valves in the first set;

controlling the positions of the n pressure regulating valves to produce one of at least n discrete pressure levels at said first output;

providing a second set of m pressure regulating valves in the pressure regulating section in communication with the second fuel line, each pressure regulating valve of the second set regulating at a different pressure than the other pressure regulating valves in the second set; and controlling the positions of the m pressure regulating valves to produce one of at least m discrete pressure levels at said second output.

20. The method of claim 19 including the addition step of controlling an auxiliary valve to produce at least two different pressures at said first output when said n pressure regulating valves are in a given position.

21. The method of claim 19 wherein said steps of controlling the positions of the n pressure regulating valves and controlling the positions of the m pressure regulating valves comprises the steps of providing an electrohydraulic servo valve having a spool and controlling the position of the spool to control a pressure applied against each of the n pressure regulating valves and m pressure regulating valves.

22. A fuel system comprising:

a first fuel line carrying fuel at a first line pressure;

a second fuel line carrying fuel at a second line pressure greater than said first line pressure;

at least one pressure regulating section comprising an input connected to said second fuel line and first and second outputs;

a plurality of first pathways from said second fuel line to said first output;

a plurality of second pathways from said second fuel line to said second output;

a pressure regulating valve in each of said first pathways and second pathways;

a spool valve positionable to selectively control fluid flow through each of said first and second pathways; and a controller for controlling the position of said spool to selectively produce a first pressure at said first output and a second pressure at said second output.

23. The fuel system of claim 22 wherein said first pressure is equal to said second pressure.

24. The fuel system of claim 22 wherein said second pressure is dependent upon said first pressure.

25. The fuel system of claim 22 wherein said first and second pressures are settable at a first level, a second level greater than said first level or a third level greater than said second level, said controller holding said second pressure at said first or second level when said first pressure is at said second level and holding said second pressure at said second or third level when said first pressure is at said third level.

26. The fuel system of claim 22 wherein said first and second pathways at least partially overlap.

* * * * *

UNITED STATES PATENT AND TRADEMARK OFFICE
CERTIFICATE OF CORRECTION

PATENT NO. : 7,386,981 B2  Page 1 of 1
APPLICATION NO. : 11/032744
DATED : June 17, 2008
INVENTOR(S) : Edward J. Zielinski et al.

It is certified that error appears in the above-identified patent and that said Letters Patent is hereby corrected as shown below:

Column 15, line 19, "pats" should be changed to --path--.

Signed and Sealed this

Thirtieth Day of September, 2008

JON W. DUDAS
*Director of the United States Patent and Trademark Office*